(12) United States Patent
Mongrain et al.

(10) Patent No.: US 11,851,821 B2
(45) Date of Patent: *Dec. 26, 2023

(54) HEAT SEALABLE PAPER-BASED SUBSTRATE COATED WITH WATER-BASED COATINGS, ITS PROCESS OF MANUFACTURING AND USES THEREOF

(71) Applicant: Cascades Sonoco Inc., Kingsey Falls (CA)

(72) Inventors: Yvon Mongrain, Lavaltrie (CA); Etienne Levert, Sherbrooke (CA); Simon Provencher, Victoriaville (CA)

(73) Assignee: Cascades Sonoco Inc., Kingsey Falls (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,716

(22) Filed: Sep. 12, 2022

(65) Prior Publication Data

US 2023/0012879 A1 Jan. 19, 2023

Related U.S. Application Data

(63) Continuation of application No. 16/939,290, filed on Jul. 27, 2020.

(60) Provisional application No. 62/879,255, filed on Jul. 26, 2019.

(51) Int. Cl.

| | |
|---|---|
| *D21H 19/82* | (2006.01) |
| *C09D 5/26* | (2006.01) |
| *D21H 19/12* | (2006.01) |
| *D21H 27/10* | (2006.01) |
| *D21H 19/84* | (2006.01) |
| *D21H 19/20* | (2006.01) |
| *D21H 19/56* | (2006.01) |
| *D21H 19/22* | (2006.01) |

(52) U.S. Cl.
CPC ............ *D21H 19/824* (2013.01); *C09D 5/26* (2013.01); *D21H 19/12* (2013.01); *D21H 19/20* (2013.01); *D21H 19/22* (2013.01); *D21H 19/56* (2013.01); *D21H 19/82* (2013.01); *D21H 19/84* (2013.01); *D21H 27/10* (2013.01)

(58) Field of Classification Search
CPC ...... D21H 19/824; D21H 19/12; D21H 27/10; C09D 5/26
See application file for complete search history.

(56) References Cited

U.S. PATENT DOCUMENTS

| | | |
|---|---|---|
| 4,087,397 A | 5/1978 | Martorano et al. |
| 5,654,039 A | 8/1997 | Wenzel et al. |
| 5,763,100 A | 6/1998 | Quick et al. |
| 5,773,131 A | 6/1998 | Dettling |
| 5,837,383 A | 11/1998 | Wenzel et al. |
| 5,868,309 A | 2/1999 | Sandstrom et al. |
| 5,935,664 A | 8/1999 | Robinson et al. |
| 6,133,168 A | 10/2000 | Doyle et al. |
| 6,207,242 B1 * | 3/2001 | Hoffman ............... B65D 5/563 428/903.3 |
| 6,268,440 B1 | 7/2001 | Kudo et al. |
| 6,866,383 B2 | 3/2005 | Naik et al. |
| 7,452,927 B2 | 11/2008 | Hayes |
| 8,048,514 B2 | 11/2011 | Müsig et al. |
| 8,329,309 B2 | 12/2012 | Leplatois et al. |
| 9,200,409 B2 | 12/2015 | Hartmann et al. |
| 2004/0131871 A1 | 7/2004 | Lee et al. |
| 2007/0292643 A1 | 12/2007 | Renn |
| 2008/0095989 A1 | 4/2008 | Eubanks et al. |
| 2010/0086746 A1 | 4/2010 | Kersnick et al. |
| 2010/0210745 A1 | 8/2010 | McDaniel et al. |
| 2010/0233146 A1 | 9/2010 | McDaniel |
| 2011/0020556 A1 | 1/2011 | Satgurunathan et al. |
| 2011/0020629 A1 | 1/2011 | Müssig et al. |
| 2011/0027601 A1 | 2/2011 | Ruffner, Jr. et al. |
| 2011/0046284 A1 | 2/2011 | Berube et al. |
| 2011/0097530 A1 | 4/2011 | Gohil et al. |
| 2013/0084437 A1 | 4/2013 | McGee |
| 2016/0153149 A1 | 6/2016 | Mongrain |
| 2016/0168799 A1 | 6/2016 | Constant |
| 2017/0008264 A1 | 1/2017 | Nevalainen et al. |
| 2018/0058010 A1 * | 3/2018 | Mongrain .............. D21H 19/56 |
| 2019/0077537 A1 | 3/2019 | Fortin et al. |
| 2019/0257034 A1 | 8/2019 | Pang et al. |

* cited by examiner

*Primary Examiner* — Callie E Shosho
*Assistant Examiner* — Bethany M Miller
(74) *Attorney, Agent, or Firm* — Eversheds Sutherland (US) LLP

(57) ABSTRACT

A heat sealable paper-based substrate is provided with at least the first surface covered with at least one primer coat and at least one topcoat over the primer coat, wherein: the primer coat is formed from a substantially wax-free aqueous dispersion of at least one polymer or copolymer, has a coefficient of thermal expansion equal to or less than about 200 μm/(m·° C.) for at least one operating temperature, and has a complex viscosity of at least about 80000 poises at a heat seal temperature; the topcoat has a different composition than the primer coat and is formed from an aqueous dispersion of at least one thermoplastic polymer or copolymer, and has a complex viscosity of at least about 3000 poises at a heat seal temperature. The heat sealable paper-based substrate can be used to make articles to contain goods such as cold or hot beverages or food products.

23 Claims, 17 Drawing Sheets

HEAT SEALABLE PAPER-BASED SUBSTRATE COATED WITH WATER-BASED COATINGS, ITS PROCESS OF MANUFACTURING AND USES THEREOF

RELATED APPLICATION

This application is a continuation of U.S. patent application Ser. No. 16/939,290, filed Jul. 27, 2020, which claims priority to U.S. Provisional Patent Application No. 62/879,255, filed Jul. 26, 2019. The content of these applications is incorporated by reference herein.

TECHNICAL FIELD

The technical field relates to heat sealable paper-based substrates coated with water-based coatings, to a process for coating a paper-based substrate with such water-based coatings and to articles obtained from the heat sealable coated paper-based substrates. The coatings can provide some barrier and/or resistance properties to the heat-sealable paper-based substrates.

TECHNICAL BACKGROUND

In the paper industry, extrusion coatings based on polyethylene are generally used to provide grease or oil resistance, water resistance and/or heat resistance to the paperboards coated with such coatings. These polyethylene-based coatings are useful for making paperboard products while maintaining integrity of the barriers in the products erected from such paperboards. Polyethylene-coated paperboards can be heat sealed on themselves or on non-coated paper-based substrates in a wide temperature range, which can be interesting for various applications. However, even though polyethylene extrusion coatings are recyclable, it is not possible to repulp the cardboard coated with such coatings.

Water-based coatings are seen as more environmental-friendly alternative to polyethylene coatings since they can be recycled and repulped. However, selecting proper water-based coatings that are suitable for making heat sealable paperboards can be difficult. Indeed, most known water-based coatings can provide the desired barrier properties, but their heat sealing ability can be limited. For instance, water-based coatings, which are not properly heat sealed, may "peel off" from the paperboard, or peel off can be observed between coatings, resulting in a weakening, and eventually dislocation, of the article made from the coated paperboard.

BRIEF SUMMARY

According to one aspect, there is provided a heat sealable paper-based substrate comprising a first surface and a second surface, at least the first surface being substantially covered with at least one primer coat and at least one topcoat over the at least one primer coat, wherein
the primer coat is formed from a substantially wax-free aqueous dispersion of at least one polymer or copolymer,
the primer coat has a coefficient of thermal expansion equal to or less than about 200 μm/(m·° C.) for at least one operating temperature,
the primer coat has a complex viscosity of at least about 80000 poises at a heat seal temperature,
the topcoat has a different composition than the primer coat and is formed from an aqueous dispersion of at least one thermoplastic polymer or copolymer, and
the topcoat has a complex viscosity of at least about 3000 poises at a heat seal temperature.

According to another aspect, there is provided a process for preparing the heat sealable paper-based substrate as defined herein, comprising:
applying the primer coat aqueous dispersion to at least one surface of the substrate,
drying the primer coat aqueous dispersion to obtain the primer coat,
chilling the primer coat to a temperature of less than about 40° C.,
applying the topcoat aqueous dispersion over the primer coat,
drying the topcoat aqueous dispersion to obtain the topcoat, and chilling the topcoat.

According to another aspect, there is provided an article made from the heat sealable paper-based substrate as defined herein or obtained from the process as defined herein.

In some implementations, the article can be a cup, a folding carton, a container, a box, a lightweight paper for ream wrap, a sachet, a bag, or a flexible packaging.

According to another aspect, there is provided the use of the heat sealable paper-based substrate as defined herein or obtained from the process as defined herein to make an article selected from a cup, a folding carton, a container, a box, a light weight paper for ream wrap, a sachet, a bag, or a flexible packaging.

DETAILED DESCRIPTION

Figure 1:
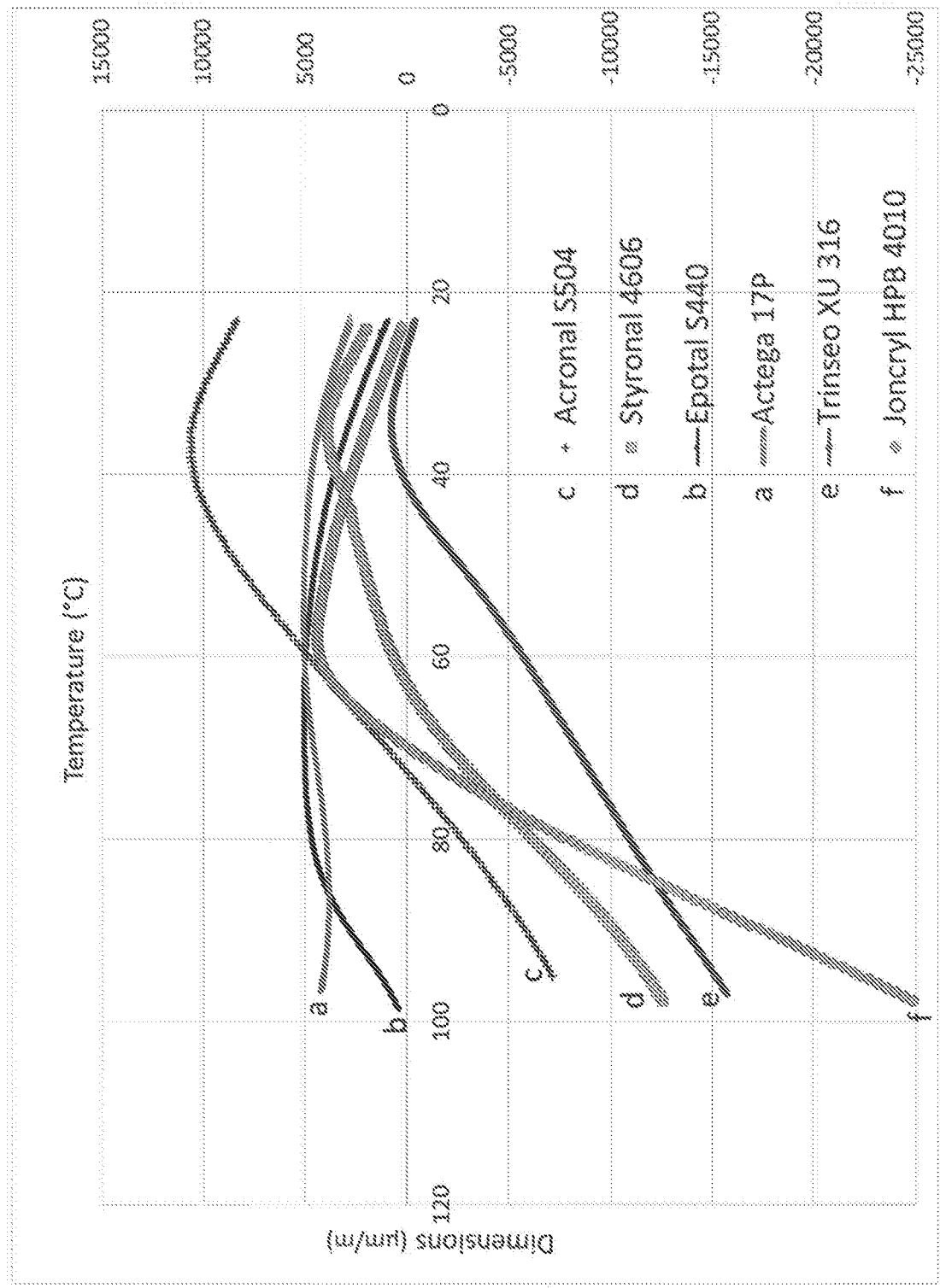
FIG. 1 represents the curves showing the dimension changes in function of the temperature for various primer coatings observed by TMA for temperatures ranging from about 95° C. to about 25° C.

A paper-based substrate coated with water-based coatings which is heat sealable and can present some barrier properties such as water-resistance, grease or oil resistance, heat resistance, odor barriers, and/or moisture resistance, will be described in detailed below. The paper-based substrate is covered on at least one of its surfaces with a primer coat and a second coat over the primer coat also referred to as "topcoat". The characteristics of each of the primer coat and topcoat will be described below. Beforehand, definitions of certain terms and expressions used in the present description are provided.

Definitions

A "paper-based substrate" refers to any type of cellulosic fiber-based product, which can be manufactured from pulp according to known paper manufacturing processes. In some implementations, the pulp used to manufacture the cellulosic fiber-based product can derive from wood and/or any other cellulose-containing plant or vegetal including, but not limited to cotton, bagasse, straw, bamboo, hemp, flax, etc. In other implementations, the pulp can be made from recycled paper. In other implementations, the paper-based substrate can also contain synthetic fibers (e.g. rayon). In further implementations, the paper-based substrate can be a recycled liner, a virgin liner, a medium, a fine paper, a newspaper, a chipboard, a Kraft paper, a paperboard, or molded pulp.

The expression "heat sealable", as used herein, refers to the ability of the coated paper-based substrate to be sealed upon application of heat. When the coated paper-based substrate presents a suitable heat seal ability, this means that no peel off is observed between the primer coat and the topcoat once the substrate has been heat sealed and cooled. In other words, the coated paper-based substrate presents heat seal ability when there is no delamination between the primer coat and the topcoat once the substrate has been heat sealed and cooled. Moreover, the coated paper-based substrate is said to present heat sealing ability if paperboard fibers are ripped upon peeling away the two sealed surfaces. The coated paper-based substrate can be heat sealed either on itself or on another uncoated paper-based substrate. When the coated paper-based substrate is coated on both of its surfaces, "heat sealed on itself" then means that both coated surfaces are heat sealable. If the coated paper-based substrate is coated on only one of its surfaces, then "heat sealed on itself" can mean that the coated surface is heat sealed to the uncoated surface or that the coated surface is heat sealed to itself.

The expression "operating temperature", as used herein, corresponds to the temperature at which the primer coat comprised in the coated paper-based substrate is operative. More specifically, the operating temperature corresponds to the temperature at which the combination of the primer coat and the topcoat can provide a heat sealable paper-based substrate where no peel off is observed after heat sealing the coated substrate, storage and/or during utilisation of an article made of the coated substrate. In some embodiments, the operating temperature can correspond to a temperature at which the primer coat is substantially stable, meaning that the primer coat does not expand or contract to an extent that would result in peel off between the primer coat and the topcoat. As will be explained below, the expansion or contraction of the primer coat can be expressed by the coefficient of thermal expansion of the primer coat. In some embodiments, the operating temperature can be equal to or below about 260° C. In other embodiments, the operating temperature can be below about 120° C., or equal to or below about 115° C. In some embodiments, the operating temperature can be comprised in the range of temperatures at which the topcoat recrystallises.

The expression "heat seal temperature", as used herein, describes the temperature of the polymeric coating comprising at least the primer coat and the topcoat as defined herein, during the thermosealing process. In other words, the "heat seal temperature" corresponds to the temperature reached by the polymeric coating in the heat sealer, which is different than the temperature at which the heat sealer itself is operated. The operation temperature of the heat sealer at the mill must be set high enough for the polymeric coating to reach the heat seal temperature in a given rate of production and heat seal pressure. One skilled in the art will be able to select the heat sealer operation conditions, including the operation temperature and conversion line speed, in order to reach the desired heat seal temperature. For instance, if the conversion line would run faster, the operator would increase the temperature of the heat sealer for reaching the desired heat seal temperature of the polymeric coating. The "heat seal temperature" can be measured using any type of temperature-indicating devices known in the art, such as temperature-sensitive tapes or labels. For instance, the "heat seal temperature" can be measured using the labels sold under the tradename 8-Temp Thermolabel® by the company PaperThermometer™.

The expression "temperature of use" refers to the temperature or temperature range at which the product or article made from the coated paper-based substrate can be utilized by the users. The temperature of use can be very different depending on intended use and/or the type of goods to be contained in the article. In some implementations, the temperature of use can be up to about 115° C. In some implementations, for example if the article made from the coated paper-based substrate is a coffee cup, the temperature of use can be up to about 100° C. Differently, if the article is intended to contain ice cream or any other frozen good, the temperature of use could be around about −20° C.

The "Coefficient of Thermal Expansion" (CTE) expresses to which extent a material undergoes dimension change in a given linear direction with respect to temperature. In the present application, the CTE of the primer coat is measured upon cooling. The CTE expresses the rate of change of unit length per unit degree change in temperature of the sample. One can also refer to the "Linear Coefficient of Thermal Expansion". The CTE is expressed in $\mu m/(m \cdot °C)$. CTE can be measured using a ThermoMechanical Analyzer (TMA). For polymeric material, the variation of the CTE can be linear when the material does not exhibit a phase transition in the temperature range of interest. However, one can also observe a non-linear variation of the CTE for some polymeric materials in certain temperature ranges, which can be due to a phase change in the material. In addition, the polymeric material can expand at certain temperatures and contract at other temperatures. When the measured CTE at a given temperature is a positive value, this means that the polymeric material has undergone an expansion at this temperature. If the measured CTE at a given temperature is a negative value, this means that the polymeric material has undergone a contraction at this temperature. In some embodiments, the CTE of the primer coat can be equal to or below about 200 $\mu m/(m \cdot °C)$ at the operating temperature. This value of 200 $\mu m/(m \cdot °C)$ is to be considered as an absolute value, meaning that it can correspond to a value in expansion or in contraction. Hence, the CTE of the primer coat at the operating temperature can either have a value above zero up to about 200 $\mu m/(m \cdot °C)$ or have a value below zero up to about −200 $\mu m/(m \cdot °C)$.

The "recrystallisation temperature" refers to the temperature or temperature range at which the topcoat recrystallizes as determined by Differential Scanning calorimetry (DSC). One refers to "recrystallisation" temperature since this temperature corresponds to the temperature at which the topcoat re-solidifies upon cooling after the topcoat has been melted in the heating phase of the DSC. The recrystallisation is reflected by an exothermic recrystallization peak in the cooling cycle of the DSC.

The "complex viscosity" describes the flow resistance of the sample in the structured states (i.e. non liquid), originating as viscous flow (imaginary part) or elastic flow (real part) resistance to oscillating movement. A high value of complex viscosity corresponds to a greater resistance to flow in the structured state. In the present heat sealable substrate, the primer coat and topcoat can be characterized by their complex viscosity at a given temperature, as will be detailed below.

The "coefficient of friction" describes the ratio of the normal force pressing two bodies together to the tangential friction force. Friction coefficient can vary from one material to another since it is governed by atomic level interaction between surfaces. The coefficient of static friction is greater than the coefficient of kinetic friction and expresses the minimal force to apply on two bodies to induce a displacement. Once the bodies slide against each other, friction force is governed by the kinetic coefficient of friction. In the present heat sealable substrate, the coating resulting from the combination of the primer coat and topcoat applied to the substrate's surface, i.e. the coated surface of the substrate, can be characterized by its coefficient of static friction ($\mu s$) and coefficient of kinetic friction ($\mu k$).

The "melting enthalpy" ($\Delta H_m$) is a measure of the required energy, expressed in joules per gram (J/g) to fully melt the crystalline region of a polymer. In the present heat sealable substrate, the topcoat can be characterized by its melting enthalpy.

The expression "melting range", as used herein, defines the difference between the temperature where a sample starts to melt and the temperature where melting is complete. In other words, the melting range corresponds to the span of temperatures from the point at which a sample in solid state first begins to liquefy to the point at which the entire sample is in liquid state. In the present heat sealable substrate, the melting range of the topcoat can be relatively broad.

The "glass transition temperature" ($T_g$) is the temperature at which a polymer's amorphous region changes from the "rubbery" state to the "glassy" state. In the present heat sealable substrate, the topcoat can be characterized by its glass transition temperature, which can be, for instance, less than or equal to about 50° C.

In the present description, the substrate thickness, i.e. before applying the coatings, can be provided in points. In some implementations, the substrate thickness can range from about 3 to about 60 pts (1 point=0.001 inch=25.4 $\mu m$).

In the present description, the term "about" means within an acceptable error range for the particular value as determined by one of ordinary skill in the art. This error range may depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundary of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

In the present description, an embodiment is an example or implementation of the innovation. The various appearances of "one embodiment," "an embodiment" or "some embodiments" do not necessarily all refer to the same embodiments. Reference in the specification to "some embodiments", "an embodiment", "one embodiment" or "other embodiments" means that a particular feature, structure, or characteristic described in connection with the embodiments is included in at least some embodiments, but not necessarily all embodiments, of the innovation. The terms "implementation" and "embodiment" are used interchangeably in the specification.

Although various features of the innovation may be described in the context of a single embodiment, the features may also be provided separately or in any suitable combination. Conversely, although the innovation may be described herein in the context of separate embodiments for clarity, the innovation may also be implemented in a single embodiment.

It is to be understood that the phraseology and terminology employed herein is not to be construed as limiting and are for descriptive purposes only.

The present innovation may be implemented in the testing or practice with methods and materials equivalent or similar to those described herein.

Primer Coat

The heat sealable paper-based substrate as described herein is primarily covered on one of its surface with a primer coat, which can be used as a basecoat for the topcoat applied thereon. The primer coat is formed from a first coating including an aqueous dispersion of at least one polymer or copolymer. In some embodiments, the polymer or copolymer in the primer coat can be crosslinked polymer and the aqueous dispersion used for making the primer coat is substantially wax-free, meaning that it does not contain any wax component (e.g. paraffins) or only traces of wax component. In one embodiment, the primer coat is wax-free.

The primer coat can be characterized by its coefficient of thermal expansion (CTE), which should have a certain value. Indeed, the present inventors have observed that for some water-based coatings, the polymeric film, which can contract and/or expand upon applying heat during the heat sealing process, can then further expand and/or contract to such an extent upon cooling, resulting in a dislocation between the primer coat and the topcoat. Such behaviour may then result in losing barrier properties provided at least by the topcoat.

In order to avoid dislocation between the primer coat and the topcoat upon cooling during the heat sealing process, the primer coat of the present heat sealable paper-based substrate can be characterized by a CTE equal to or less than about 200 μm/(m·° C.) for at least one operating temperature. In some embodiments, the primer coat can have a CTE equal to or less than about 200 μm/(m·° C.) for at least one given temperature or temperature range, while having a CTE above 200 μm/(m·° C.) for another temperature or another temperature range.

In addition to be characterized by a specific CTE, the primer coat of the heat sealable paper-based substrate is also characterized by its complex viscosity, which should have a certain minimum value. In some embodiments, the complex viscosity of the primer coat can be at least about 80000 poises at a heat seal temperature. As previously explained, the heat seal temperature represents the temperature of the polymeric coating itself upon heat sealing, i.e. the temperature of the polymeric coating in the heat sealer. In some embodiments, the primer coat can have a complex viscosity of at least about 1000000 poises at the heat seal temperature. In some embodiments, the heat seal temperature can range from about 60° C. to about 180° C. In other embodiments, the heat seal temperature can range from about 70° C. to about 160° C. In alternative embodiments, the heat seal temperature can range from about 90° C. to about 160° C., or from about 100° C. to about 150° C., or from about 110° C. to about 140° C., or from about 110° C. to about 120° C. (e.g. about 115° C.).

In other embodiments, the primer coat is characterized by a complex viscosity of at least about 100000 poises at a temperature of use that can be below the heat seal temperature. The temperature of use, in some implementations, can be up to about 115° C. In other implementations, the temperature of use can be less than or equal to about 95° C. In other implementations, the temperature of use can range from about −20° C. to about 95° C.

In some embodiments, the primer coat can also be characterized by its glass transition temperature (Tg), which can be less than or equal to about 50° C. In some embodiments, the glass transition temperature (Tg) of the primer coat can be less than or equal to about 45° C., or less than or equal to about 40° C., or less than or equal to about 35° C., or less than or equal to about 30° C., or less than or equal to about 25° C., or less than or equal to about 20° C., or less than or equal to about 15° C., or less than or equal to about 10° C. In some embodiments, the glass transition temperature (Tg) of the primer coat can be from about 2° C. to about 10° C., or from about 2° C. to about 8° C., or from about 2° C. to about 6° C.

The polymers or copolymers, which can be used for the primer coat and are applied to the paper-based substrate as aqueous dispersions, can include a variety of polymers or copolymers. If the primer coat can include one type of polymer or copolymer, in other embodiments, the primer coat can include more than one polymer or copolymer. Hence, mixtures of polymers or copolymers, present in the same aqueous dispersion or resulting from the combination of two or more aqueous dispersions, can also be used to make the primer coat. In some embodiments, the aqueous dispersion applied to the paper-based to form the primer coat can include a polymer or copolymer selected from an acrylic acid polymer, an acrylate polymer, a methylacrylate polymer, an ethylacrylate polymer, a propylacrylate polymer, a butylacrylate polymer, a styrene/butadiene copolymer, a styrene/acrylate copolymer, a styrene/butylacrylate copolymer, a styrene/acrylonitrile copolymer, a butadiene/acrylonitrile copolymer, a styrene/acrylonitrile/acrylate copolymer, a polylactic acid, a polybutylene succinate, a polyhydroxyalkanoate, a polyolefin, and any mixture thereof.

In other embodiments, the polymer or copolymer present in the aqueous dispersion used to make the primer coat can include a styrene/butadiene copolymer, a styrene/butylacrylate copolymer, a butadiene/acrylonitrile copolymer, a styrene/acrylonitrile/acrylate copolymer, and any mixture thereof. In some embodiments, the aqueous-based coating for the primer coat can include a styrene/butadiene copolymer or butadiene/acrylonitrile copolymer or any mixture thereof. In some embodiments, the styrene/butadiene copolymer can be carboxylated.

In further embodiments, the primer coating aqueous dispersion, in addition to the polymer(s) or copolymer(s) and water, can contain some additives such as a thickening agent, a defoaming agent, a dispersant, a wetting agent, an UV inhibitor, mineral charges (such as talc, clay, calcium carbonate, titanium dioxide, mica, etc.), a crosslinker, a fungicide, a biocide, dyes, pigments. Other additives known to those having skill in the art may also be incorporated into the primer coat so long as such additives do not adversely affect the performance.

In addition to serve as a basecoat for the topcoat and to provide adhesion of the final coating to the paper-based substrate, the primer coat can also provide some barrier properties, such as moisture and/or grease or oil barriers to the heat sealable paper-based substrate. The primer coat can also provide some flexibility to the coated heat sealable paper-based substrate, which can be resistant to cracks upon folding.

Topcoat

The paper-based substrate is also coated with a second coat, which covers the primer coat, and which can provide some heat sealable properties to the final paper-based coated substrate. The topcoat can also provide some barrier properties to heat sealable paper-based substrate, such as water-resistance, grease or oil resistance, heat resistance, odor barriers, and/or moisture resistance.

The topcoat should present a good adhesion to the primer coat meaning that the two coats should not delaminate upon heat sealing the coated paper-based substrate. In other words, the topcoat should present some characteristics in order for the primer coat/topcoat combination to provide a good heat seal and avoid peel off between the two coating layers. At least one of these characteristics is the complex viscosity of the topcoat, which should have a certain value at the heat seal temperature.

In some embodiments, the topcoat is characterized by a complex viscosity of at least about 3000 poises at the heat seal temperature, i.e. at the temperature of the topcoat layer during the heat sealing process. As mentioned above, the heat seal temperature can range from about 60° C. to about 180° C. In other embodiments, the heat seal temperature can range from about 70° C. to about 160° C. In alternative embodiments, the heat seal temperature can range from about 90° C. to about 160° C., or from about 100° C. to about 150° C., or from about 110° C. to about 140° C., or from about 110° C. to about 120° C. (e.g. about 115° C.). In some embodiments, the complex viscosity of the topcoat can be at most about 600000 poises at the heat seal temperature. In some embodiments, the complex viscosity of the topcoat can be between about 3000 poises and 600000 poises at the heat seal temperature. In some embodiments, the complex viscosity of the topcoat can be between about 3000 poises and 600000 poises at a heat seal temperature from about 70° C. to about 165° C. In some embodiments, the complex viscosity of the topcoat can be between about 3000 poises and 600000 poises at a heat seal temperature from about 80° C. to about 165° C. In some embodiments, the complex viscosity of the topcoat can be between about 3000 poises and 600000 poises at a heat seal temperature from about 110° C. to about 165° C.

In other embodiments, the topcoat can be characterized by its complex viscosity at the temperature of use. For some utilizations, for instance if the paper-based substrate would be used to make an article to hold hot goods (e.g., hot coffee), the topcoat should preferably present a minimum value for its complex viscosity at the temperature of use. Using a topcoat presenting a proper complex viscosity, for an application at high temperature, can avoid that the heat sealed portions of the article disconnect at this temperature. One skilled in the art would also understand that if the topcoat presents a proper complex viscosity for being used at high temperatures, the topcoat would also be suitable for being used at lower temperatures, where the disconnection issue would not be encountered. Hence, in some embodiments, the topcoat can be characterized by a complex viscosity of at least about 300000 poises at the temperature of use. In some embodiments, the topcoat can have a complex viscosity of at least about 1000000 poises at a temperature of use that can be below the heat seal temperature.

The temperature of use, in some implementations, can be up to about 115° C. In other implementations, the temperature of use can be less than or equal to about 95° C. In other implementations, the temperature of use can range from about −20° C. to about 95° C.

In some embodiments, the topcoat of the heat sealable paper-based substrate can also be characterized by some thermal properties, including for example its melting enthalpy and its melting range. Hence, in some embodiments, the topcoat the heat sealable paper-based substrate can be characterized by a melting enthalpy of at least about 10 J/g. In other embodiments, the topcoat can present a melting enthalpy of at least about 20 J/g. In further embodiments, the topcoat can be characterized by a melting enthalpy of at least about 25 J/g. The melting enthalpy of the topcoat can be less than or equal to 120 J/g, or even less than or equal to 50 J/g, in some embodiments. With regard to the melting range, the topcoat can present a relatively broad melting range of at least about 40° C., which can be advantageous for a variety of utilizations and/or to vary the heat seal temperature of the heat sealable paper based substrate. In some embodiments, the topcoat can be characterized by a melting range of at least 60° C. up to about 110° C. In further embodiments, the topcoat can be characterized in that is starts melting at a temperature ranging from about 20 to about 40° C. and is fully melted at a temperature ranging from about 80 to about 120° C.

As mentioned above, the topcoat can present a variety of barriers, such as water and/or moisture barrier, a barrier to oil and/or grease, an odour barrier etc., which can be provided by the polymers or copolymers present in the aqueous dispersions used for making the topcoat. The polymers or copolymers in the aqueous dispersions used to make the topcoat can be thermoplastic polymers or copolymers and can include acrylic acid-based polymer dispersions, acrylate-based polymer dispersions, polyolefin dispersions, polylactic acids, polybutylene succinates, polyhydroxyalkanoates, polyvinylidene chloride (PVDC), polyvinylalcohol, polyvinylacetate, or any mixture thereof.

In some embodiments, the aqueous dispersion for making the topcoat can include ethylene/acrylic acid copolymers, ethylene/acrylate copolymers, acrylate/acrylonitrile copolymers, low density polyethylenes, or any mixture thereof. In other embodiments, the aqueous dispersions for the topcoat can include a polymer or copolymer selected from an acrylic acid polymer, an ethylene/acrylic acid copolymer, an ethylene/methacrylate copolymer, an ethylene/ethylacrylate copolymer, a poly(hexadecylacrylate), a poly(hydroxybutyl methacrylate), an acrylate/acrylonitrile copolymer, a low density polyethylene, and any mixture thereof. In some implementations, the aqueous dispersion to prepare the topcoat can include an ethylene/acrylic acid copolymer, an ethylene/methacrylate copolymer, an ethylene/ethylacrylate copolymer, a low density polyethylene, and any mixture thereof.

In some embodiments, the topcoat aqueous dispersion can contain an ethylene/acrylic acid copolymer, ethylene/methacrylate copolymer, or ethylene/ethylacrylate copolymer including at least 80 mol % of ethylene moieties.

In further implementations, the topcoat aqueous dispersion, in addition to the polymer(s) or copolymer(s) and water, can contain some additives such as a thickening agent, a defoaming agent, a dispersant, a wetting agent, an UV inhibitor, mineral charges (such as talc, clay, calcium carbonate, titanium dioxide, mica, etc.), a crosslinker, a fungicide, a biocide, dyes, pigments. Other additives known to those having skill in the art may also be incorporated into the primer coat so long as such additives do not adversely affect the performance.

The aqueous dispersion for the topcoat can also be characterized by its contact angle with the primer coat, i.e., the contact angle with the dried primer coat once the aqueous dispersion of the primer coat has been applied and dried. In some implementations, the aqueous dispersion used to make the topcoat can present a contact angle with the primer coat equal to or less than about 70 degrees. In other embodiments, the aqueous dispersion of the topcoat can present a contact angle with the primer coat ranging from about 25 degrees to about 60 degrees, or in some implementations, ranging from about 30 degrees to about 55 degrees.

Heat Sealable Coated Paper-Based Substrate

The heat sealable paper-based substrate is the paper-based substrate which is coated on at least one of the substrate's surface with at least the primer coat and the topcoat as defined herein. Moreover, in addition to be coated on at least one surface, the substrate can also be coated on the second surface with at least the primer coat, at least the topcoat or at least both the primer coat and the topcoat over the primer coat. In some embodiments, additional coats can be present in the heat sealable paper-based substrate, either between the substrate and the primer coat, between the primer coat and the topcoat, and/or over the topcoat. It is also worth noting that each coat (primer coat, topcoat or any other additional coat) can result from applying more than one layer of the corresponding aqueous dispersion.

In some embodiments, the first surface of the substrate can be coated with a first primer coat and a first topcoat, and the second surface can be coated with a second primer coat different than the first primer coat and a second topcoat which can be the same or different than the first topcoat. In an alternative embodiment, the first surface of the substrate can be coated with a first primer coat and a first topcoat, and the second surface can be coated with a second primer coat which is the same or different than the first primer coat and a second topcoat which is different than the first topcoat.

In some embodiments, the substrate is only coated on one of its surfaces with the primer coat and the topcoat as defined herein. Hence, when erecting an article from the coated substrate, it will be possible to either heat seal the coated surface on itself or to heat seal the coated surface to the uncoated surface. In another embodiment, the substrate can be coated with the primer coat and the topcoat on one of its surfaces and the topcoat on the other surface. In this configuration, an article erected from the coated substrate, will always have the topcoat heat sealed on itself.

In some embodiments, the substrate on which the primer coat and topcoat are applied can be selected from a recycled liner, a virgin liner, a medium, a fine paper, a newspaper, a chipboard, a Kraft paper, a paperboard, or molded pulp. In some embodiments, the substrate can be a brown or white, recycled or virgin substrate selected from a liner, virgin liner, medium, fine paper, newspaper, chipboard, Kraft paper, paperboard, or molded pulp. However, the paper-based substrate is not limited to these examples and can include any other cellulosic fiber-based substrate, which can be manufactured from pulp according to known paper manufacturing processes, for instance, from pulp derived from wood and/or any other cellulose-containing plant or vegetal including, but not limited to cotton, bagasse, straw, bamboo, hemp, flax, etc. In other implementations, the pulp can be made from recycled paper. In other implementations, the paper-based substrate can also contain synthetic fibers (e.g. rayon).

In some embodiments, the basis weight of the substrate can range from about 30 g/m$^2$ to about 1000 g/m$^2$. In another embodiment, the substrate can have a basis weight ranging from about 200 g/m$^2$ to about 400 g/m$^2$.

In some embodiments, the substrate used to make the heat sealable paper-based substrate can present a thickness ranging from about 3 to about 60 pts. In other embodiments, the substrate's thickness can range from about 10 to about 24 pts or, in further embodiments, from about 12 to about 20 pts.

In some embodiments, the thickness of primer coat onto the paper substrate can range from about 1 μm to about 15 μm. In other embodiments, the thickness of primer coat can range from about 1 μm to about 12 μm, or from about 2 μm to about 12 μm, or from about 8 μm to about 12 μm. In further embodiments, the thickness of the topcoat can range from about 0.5 μm to about 18 μm. In some embodiments, the thickness of the topcoat can range from about 0.5 μm to about 15 μm, or from about 1 μm to about 15 μm, or from about 1 μm to about 10 μm, or from about 1 μm to about 5 μm.

In some embodiments, the heat sealable paper-based substrate, that is the substrate coated with the primer and topcoat on at least one substrate's surface, can be characterized in that the coated surface presents a coating on coating coefficient of static friction ($\mu_s$) of at least about 0.37. In other embodiments, the surface of the heat sealable paper-based substrate coated with the primer coat and topcoat as defined herein, can present a coating on coating coefficient of static friction ($\mu_s$) of at least about 0.63. In further embodiments, the heat sealable paper-based substrate can be characterized in that the surface coated with the primer coat and topcoat presents a coating on coating coefficient of kinetic friction ($\mu_k$) of at least about 0.22. In some embodiments, the coating on coating coefficient of kinetic friction ($\mu_k$) of the coated substrate's surface can be of at least about 0.60.

In further embodiments, the heat sealable paper-based substrate can be flexible, meaning that the coating would not crack upon folding the paper-based substrate to make an article therefrom (e.g. bottom of a paper cup, take-out box, flexible packaging bag).

In some embodiments, the heat sealable paper-based substrate can be repulped and can be recycled due to the use of an aqueous dispersion as the coating for the primer coat and topcoat. The amount of coated material that can be put into a pulper can be higher than for traditional polyethylene (e.g. LDPE) extrusion coating. While repulping of LDPE extrusion coated material is generally about 20%, repulpability of the present aqueous-based coated material can reach at least about 50% in some embodiments.

In some embodiments, the heat sealable paper-based substrate can be resistant to grease and/or oil, including mineral oil, resistant to blocking, moisture resistant, printable and/or odorless, due to the nature of the polymers or copolymers or emulsifiers present in the primer coat and/or topcoat.

Process

An embodiment of a process for coating the heat sealable paper-based substrate using the above defined primer coat and topcoat will be now described.

The process for obtaining the heat sealable paper-based substrate includes a step of applying as a first coating the wax-free aqueous dispersion of the primer coat on at least one surface of the paper-based substrate. Then, the first coating can be dried to obtain the primer coat, which can then be chilled to a temperature of less than about 40° C., before applying as a second coating the aqueous dispersion of the topcoat. Once the second coating has been applied, the second coating is also dried to obtain the topcoat which can cover up the primer coat. The topcoat can then be chilled, for instance to a temperature of about 40° C.

In some embodiments, the process can involve using a machine including two systems of a coater/dryer in series. The aqueous dispersion of the primer coat is first applied onto the paper substrate through the first coater, dried and chilled, before the second coater receives the substrate coated with the primer coat and applies the aqueous dispersion of the topcoat thereon. Then, the substrate is passed through a second dryer to dry the topcoat and obtaining the heat sealable paper-based substrate.

Examples of coaters that can be used to apply the aqueous dispersions of the primer coat and topcoat can include rod coaters, blade coaters, air knife coaters, curtain coaters, slot die coaters, iso-bar rod coaters, gravure coaters, roll to roll coaters, offset coater/printers, reverse gravure coaters, or flexography. In an embodiment, the aqueous dispersions can be applied using a rod coater, a blade coater, or a curtain coater.

When using a rod coater, it can be advantageous to use a rod provided with a resilient tip metering element to obtain a substantially homogeneous application, especially on recycled paper having a roughness surface (peak-to-valley roughness). Indeed, when using such a rod, the resilient tip metering element can allow application of the coat even in the valleys at the surface of paper-substrate. This can also allow obtaining a coat with a uniform thickness as little as possible and good contour-coating. An example of rod provided with such a resilient tip metering element is the INVO® Tip commercialized by the company UMV.

When a curtain coater or slot die coater is used, it is possible to apply one or more layers of each of the primer aqueous dispersion and topcoat aqueous dispersion. When multiple layers of the same aqueous dispersion are applied there is no need to dry the coat between each layer application. The application of multiple layers of the same coat can be useful for obtaining more uniform coatings and/or the required thickness thereof.

In some embodiments, the aqueous dispersion of the primer coat can be applied on both surfaces of the paper substrate. In such embodiments, the coatings on both surfaces can be dried and chilled before application of the topcoat on at least one of the surfaces. If the aqueous dispersion of the topcoat is applied on only one surface, the heat sealable paper-based substrate will thus have a first surface coated with the primer coat and the topcoat thereon and the second surface coated with the primer coat only.

In other embodiments, the aqueous dispersion of the primer coat can be applied on one of the surfaces of the paper substrate, dried and chilled, and then the aqueous dispersion of the topcoat can be applied on both surfaces of the paper-substrate. Thus, the final heat sealable paper-based substrate will have a first surface coated with the primer coat and the topcoat thereon and the second surface coated with the topcoat only.

In some embodiments, the aqueous dispersion of the primer coat can be applied to the paper substrate to have a primer coat weight, i.e. a dried coat weight, ranging from about 3 to about 20 g/m². In other embodiments, the primer coat aqueous dispersion can be applied to the paper substrate to reach a primer coat weight ranging from about 5 to about 15 g/m², or from about 10 to about 15 g/m². In further embodiments, the aqueous dispersion of the topcoat can be applied to the dried primer coat or directly to the substrate to have a topcoat weight (dried coat weight) ranging from about 1 to about 20 g/m². In other embodiments, the topcoat aqueous dispersion can be applied to the primer coat or to the paper substrate to reach a topcoat weight ranging from about 1 to about 15 g/m², or from about 1 to about 10 g/m², or from about 1 to about 5 g/m², or from about 5 to about 10 g/m².

In some embodiments, the drying temperature, i.e. the web temperature upon drying, of the primer coat can be from about 60° C. to about 85° C. The drying temperature (web temperature) for the topcoat can range from about 60° C. to about 120° C.

Articles and Use

A variety of articles can be made using the heat sealable paper-based substrate coated with the primer coat and topcoat described above. In some implementations, the heat sealable paper-based substrate can be used to make paper cups, folding cartons (e.g., folding carton with flaps), containers, boxes, lightweight paper for ream wrap, sachets (e.g., sugar and oatmeal sachets), paper bags, or flexible packaging.

The heat sealable paper-based substrate can be used, in some implementations, to make articles to contain hot goods. For instance, the articles made using the heat sealable paper-based substrate can include coffee cups, French fries' containers, take-out boxes for restaurants, Ramen noodles soup cups, oatmeal cups, mac and cheese cups, etc.

In other implementations, the heat sealable paper-based substrate can be used to make articles to contain cold or frozen goods. For example, the articles made using the heat sealable paper-based substrate can include cold drink cups, ice cream containers, containers for frozen smoothies, containers for frozen yogurt, etc.

For manufacturing the articles using the heat sealable paper-based substrate, different process steps can be contemplated. For instance, the heat sealable paper-based substrate can be cut, folded and/or bent (curved) to provide the desired shape. In addition, the article manufacturing process can include at least one step of heat sealing the coated surface(s) of the substrate. The coated surface(s) can be either heat sealed to itself or to an uncoated substrate. In some embodiments, the heat seal step can be performed in a heat sealer heated to a temperature ranging from about 150 to about 760° C.

In some embodiments, the articles made from the coated paper-based substrate can further be treated by covering at least a portion of their surface including the part where the surfaces of the paper overlap after heat sealing, with a varnish. In some implementations, the varnish can be the aqueous dispersion used to make the topcoat or the primer coat of the coated paper-substrate itself. In some other implementations, the varnish can be applied on all the surface of the article.

In some embodiments, the articles made from the coated paper-based substrate can further be closed with a peel-off lid to secure the goods within the article. Examples of such peel-off lid that can be compatible with the coating applied on the paper-based substrate forming the article, can include films made of a layer of polyethylene terephthalate (PET) and a layer of poly(ethylene-vinyl acetate) (PEVA). In some embodiments, the PEVA layer can be heat sealed to the coated paper-based substrate to close the article made therefrom.

EXAMPLES

Laboratory Testing Procedures and Methods
Differential Scanning Calorimetry (DSC)

Droplets of each aqueous polymer dispersion useful for primer coats or topcoats (referred to as "latex" below) were dried at 105° C. for at least 4 hours in aluminum pans to yield thin layers of solid polymer. Between 5 and 15 mg of each polymer was weighted and crimped in aluminum DSC pans. DSC thermograms were performed on a Thermal Analysis (TA) Q2000 DSC apparatus in a nitrogen atmosphere. Cell constant were calibrated using an indium standard. Each sample was preheated to 150° C. to erase thermal history then cooled to −50° C. at a rate of 10° C. per minute in modulated mode. Samples were then reheated to 150° C. at a rate of 10° C. per minute in modulated mode. Thermograms were analyzed using the TA software. Melting temperatures, melting enthalpy, recrystallization temperatures, phases transition temperatures and glass transition temperatures were determined using the associated software tools. Temperature range of melting, or "melting range", was determined differentiating the onset of melting peaks and the end of the peaks.

Infrared Spectroscopy (IR)

Droplets of each latex were dried at 105° C. for at least 4 hours in aluminum pans to yield thin layers of solid polymer. Polymers were analyzed neat on an Agilent Technologies Cary 600 Series FTIR spectrometer. Peak analysis and compound assignment were performed with Bio-Rad Laboratories Inc. KnowItAll® Analytical edition software and database.

Thermomechanical Analysis (TMA)
Preparation of the Primer Samples 10 to 20 mL of the primer latex or mixture of primer latexes were dried over a week at 40° C. in in a foil dish of 3 cm diameter to yield a disk of around 5 mm thick. Discs were unmolded from the foil dish at −20° C. to limit tackiness. The discs were sent to the Centre des technologies minérale et de plasturgie (CTMP—recently renamed Coalia) for TMA analysis. For the analysis, each disc was machined into a cube of about 5 mm edges. Analysis were performed on a Thermal Analysis Q400 TMA starting at −70° C. and heating at a rate of 5° C. per minute up to reaching 95° C., unless the polymer melting temperature was lower. The coefficient of thermal expansion was calculated upon cooling at various temperatures and is reported in μm/(m·° C.).

Rheology

Aqueous polymer dispersion useful for primer coats or topcoats were coated to 8" by 12" stainless sheets with a laboratory coater using a Meyer rod "14" with 1100 grams of weight applied onto the rod for coating weight control. To achieve a sample with a thickness of 1 mm of uniform coating, 25 layers were successively made. Between application of each layer, the sample was completely dried in a forced air oven for 10 to 15 minutes and cooled for 5 minutes to room temperature. All the samples were sent to the CTMP where they were cut into disc of 1-inch square and delaminated from the stainless sheets. Rheology measurements were performed on a Thermo Scientific Haake Mars rheometer at a sheer rate of 400 Pa either upon heating from 25 to 170° C. at a rate of 5° C. per minute or upon cool-heat hysteresis from 170 to 25° C. then from 25 to 170° C. at a rate of 5° C. per minute. The collected data were treated with the software Haake RheoWin Data Manager V.4.30.0011 associated to the rheometer, to provide the complex viscosities of the samples.

Laboratory Testing of Heat Seal Aptitude

The heat seal aptitude of the coated paper substrate samples was performed using a laboratory heat sealer. The heat sealer was a 12AS/1 from Sencorp Systems Inc. First, two samples of roughly 12" by 2" of coated paper-substrate were cut using a paper trimmer. The resulting samples were then either tested with the coating face-to-face or face-to-paper. The laboratory heat sealer's temperature was brought up to 375° C. and the pressure at 24 psi, providing a temperature at the interface (polymeric coating temperature) of at least about 115° C. The contact time between the two jaws of the heat sealer was set to 1 second. The 12" by 2" samples were thus inserted either with coating face-to-face or face-to-back inside the heat sealer jaws and the heat seal was performed. Each of the resulting heat-sealed samples was then evaluated qualitatively by the operator by peeling the 12" by 2" heat sealed paper substrates from one another. After heat sealing, the operator assessed whether there was "peeling", i.e. no fiber teared upon peeling the heat sealed paper substrates from one another, or whether there was "no peeling", i.e. fibers teared upon peeling the heat sealed paper substrates from one another. When there was "no peeling" observed, i.e. the heat seal was adequate, it was also possible to determine the quality of the heat seal by qualifying it as either weak, medium or strong by the percentage of the heat sealed area where fiber tearing is observed. Generally, the heat seal was qualified as "strong" when the fibers were teared from more than about 80% of the heat-sealed area. The heat seal was qualified as "medium" when the fibers were teared from about 30 to about 80% of the heat-sealed area. The heat seal was qualified as "weak" when the fibers were teared from less than about 30% of the heat-sealed area.

Contact Angle

Contact angle measurements were performed on a DSA100 from the company Krüss GmbH. A 1" by 3" sample of a paper substrate coated with a primer coat was first glued onto a microscope slide with the primer coating side facing up. Then, the slide was put under a manual syringe position of the DSA100 so that a drop of a topcoat aqueous dispersion could be applied. The contact angle between the primer coated paper substrate and the topcoat aqueous dispersion was then determined using the Krüss imagery software.

Coefficient of Friction

Coefficient of friction was measured on an Instron® 5566 tensile tester horizontal fixture, following the recommendations of TAPPI method T 549 OM. A sample of coated paper to be analyzed was cut 4" by 11" for the bottom sample of the test and 2.5" by 7" for the top sample of the test. A sled of 1339 grams was used for this test (slight derogation from the TAPPI method). The test was performed in 5 replicates and the reported result was the average of 5 readings. The test can be performed either coating on coating or coating on fiber.

In the following examples, the quantities of the different coatings used to prepare the coated paper-based substrates are expressed in weight of dried coating per surface area. More particularly, the coating weights are expressed in g/m$^2$.

Example 1: Examples of Aqueous Dispersions and their Characteristics

Table 1 below provides a list of aqueous dispersions that could be used to make the heat sealable paper-based substrate defined herein, alone or in mixtures. The chemical nature and thermal properties of each aqueous dispersion is reported in Table 1. The DSC graphs for the various topcoats are presented in FIGS. 3-16.

Example 2: Complex Viscosities

The complex viscosity of some primer coats and topcoats was determined using the rheology method described above. The collected data allowed to determine the complex viscosity of the coats for different temperatures. Some data are reported in Table 2 (primer coats) and Tables 3 and 4 (topcoats). In addition, a more complete set of data is provided in Annex A for the primer coats complex viscosities.

TABLE 1

| | Commercial name | Company | Reference used herein | Chemical nature of aqueous dispersion including type of monomers or co-monomers | $T_g$ (° C.)[1] | Melting range (° C.)[1] | Melting ΔHm (J/g)[1] |
|---|---|---|---|---|---|---|---|
| Aqueous dispersions for Primers | XU 31687.00 Experimental Latex | Trinseo | Trinseo XU 316 | Styrene-butadiene latex[2] | 19.3 | — | — |
| | Styronal® BN 4606 X | BASF Canada Inc. | Styronal 4606 | Carboxylated styrene-butdiene latex[2] | 5.5 | — | — |
| | Epotal® S 440 | BASF Canada Inc. | Epotal S440 | poly(butylacrylate-co-styrene) | 4.4 | — | — |
| | Joncryl® DFC 3030 | BASF Canada Inc | Joncryl DFC 3030 | poly(butylacrylate-co-styrene) | 4.2 | — | — |

TABLE 1-continued

|  | Commercial name | Company | Reference used herein | Chemical nature of aqueous dispersion including type of monomers or co-monomers | $T_g$ (° C.) [1] | Melting range (° C.) [1] | Melting $\Delta Hm$ (J/g) [1] |
| --- | --- | --- | --- | --- | --- | --- | --- |
|  | Joncryl ® HPB 4010 | BASF Canada Inc | Joncryl HPB 4010 | poly(butylacrylate-co-styrene) | −0.6 | — | — |
|  | LIQUISHIELD ® AQ-X22SM17P | Actega Coating & Sealants | Actega 17P | Acrylonitrile/Butadiene copolymer (33% Acrylonitrile) | 3.3 | — | — |
|  | Acronal ® S 504 na | BASF Canada Inc. | Acronal 504 | Anionic acrylate-styrene-acrylonitrile dispersion [2] | 7.3 | — | — |
| Aqueous dispersions for Topcoats | Lamproof AC91 | Cambrian | Lamproof AC91 | Ethylene-methacrylate [3] | 6.5 | 82 | 28.6 |
|  | Lamproof AC73 | Cambrian | Lamproof AC73 | Hexadecyl acrylate [3] | 7.9 | 76 | 28.0 |
|  | Lamproof | Cambrian | Lamproof | Acrylic polymer dispersion [2] | 6.3 | 73 | 22.6 |
|  | LIQUISHIELD ® AQ-X22SM11P82 | Actega Coating & Sealants | Actega p82 | Poly Ethylene-acrylic acid (92:8) [3] | 4.9 | 68 | 20.3 |
|  | LIQUISHIELD ® AQ-X22SM11P81 rev. 2 | Actega Coating & Sealants | Actega p81 rev. 2 | Poly Ethylene-acrylic acid (92:8) [3] | — | 69 | 57 |
|  | LIQUISHIELD ® AQ-X22SM11P79 | Actega Coating & Sealants | Actega p79 | Poly Ethylene-acrylic acid (92:8) [3] | — | 60 | 46.6 |
|  | LIQUISHIELD ® AQ-X22SM11P78 | Actega Coating & Sealants | Actega p78 | Poly Ethylene-acrylic acid (92:8) [3] | 10.7 | 90 | 49.4 |
|  | LIQUISHIELD ® X22SM11P77L | Actega Coating & Sealants | Actega p77L | Poly Ethylene-acrylic acid (92:8) [3] | 1.4 | 109 | 53.2 |
|  | LIQUISHIELD ® X22SM11P77 | Actega Coating & Sealants | Actega p77 | Poly Ethylene-acrylic acid (92:8) [3] | 2.8 | 110 | 38.0 |
|  | AQUEOUS BARRIER COAT X22SM11P73 | Actega Coating & Sealants | Actega p73 | Poly Ethylene-acrylic acid (92:8) [3] | −2.6 | 81 | 31.0 |
|  | LIQUISHIELD ® X22SM11P72 | Actega Coating & Sealants | Actega p72 | Ethylene-methacrylate [3] | 0.0 | 71 | 24.7 |
|  | LIQUISHIELD ® X22SM11P71 | Actega Coating & Sealants | Actega p71 | Hydroxybutyl methacrylate [3] | 4.7 | 42 | 13.9 |
|  | AQUACER ® 1061 | BYK Additives & Instruments | Aquacer 1061 | Anionic aqueous emulsion of an ethylene acrylic acid copolymer wax [2] | 7.1 | 70 | 27.0 |
|  | Michem ® Emulsion D791 | MICHELMAN | MED791 | Ethylene-ethyl acrylate (82:18) [3] | −32.6 | 90 | 35.8 |
|  | Michem ® Prime 4983R | MICHELMAN | MP4983R | Ethylene-methacrylate [3] | 6.0 | 75 | 36.3 |
|  | Michem ® Flex P1853R | MICHELMAN | MFP1853R | Ethylene-methacrylate [3] | 4.8 | 75 | 26.5 |
|  | Michem ® Flex HS268 | MICHELMAN | MFH268 | Ethylene-methacrylate [3] | 9.5 | 72 | 18.8 |
|  | Barrier Seal R6728A | The International Group Inc. | BF R6728A | Poly Ethylene-acrylic acid (92:8) [3] | 24.8 | 60 | 17 |
|  | Joncryl ® (mixture of Joncryl ® products and additives) [4] | BASF Canada Inc. | BASF DFC | Anionic acrylic copolymer ammonium salt [2] | −29.4 | 46 | 1.4 |
|  | RHOBARR ™ 320 Polyolefin Dispersion | The Dow Chemical Company | DOW 5748A | Polyolefin (LDPE) [2] | — | 81 | 32.9 |
|  | Generic Polyolefin Dispersion Type IV | The Dow Chemical Company | DOW 6141 | Polyolefin (LDPE) [2] | — | 111 | 26 |

[1] Determined by DSC;
[2] provided by supplier company;
[3] Determined by infrared spectroscopy;
[4] Joncryl ® HLB 4020 84.3% + Joncryl ® DFC 3025 5.0% + Joncryl ® DFC 3050 10.0% + Sterocoll FS na 0.5% + Defoamer 0.2% (dry based weight percentage)

TABLE 2

| Primer coat name | Styronal ® 4606 | | | | | | |
| --- | --- | --- | --- | --- | --- | --- | --- |
| Temperature in ° C. | 93 | 114 | 118 | 123 | 140 | 151 | 154 |
| Complex viscosity in poises | 154447 | 138933 | 137895 | 137588 | 137913 | 139973 | 140727 |

| Primer coat name | Epotal ® S440 | | | | | | |
| --- | --- | --- | --- | --- | --- | --- | --- |
| Temperature in ° C. | 93 | 114 | 118 | 123 | 140 | 151 | 154 |
| Complex viscosity in poises | 1488694 | 1888257 | 2024589 | 2032497 | 1944162 | 1271558 | 1007251 |

TABLE 2-continued

| Primer coat name | Joncryl ® DFC 3030 | | | | | | |
|---|---|---|---|---|---|---|---|
| Temperature in ° C. | 93 | 114 | 118 | 123 | 140 | 151 | 154 |
| Complex viscosity in poises | 1882178 | 3073208 | 3299617 | 3475489 | 3324240 | 2552153 | 2162470 |
| Primer coat name | Trinseo XU 316 | | | | | | |
| Temperature in ° C. | 93 | 114 | 118 | 123 | 140 | 151 | 154 |
| Complex viscosity in poises | 377082 | 296124 | 288552 | 279185 | 264166 | 260300 | 260212 |
| Primer coat name | Actega 17P | | | | | | |
| Temperature in ° C. | 93 | 114 | 118 | 123 | 140 | 151 | 154 |
| Complex viscosity in poises | 2862637 | 3070749 | 3123645 | 3273405 | 3243113 | 3114346 | 3125829 |
| Primer coat name | Acronal ® S504 | | | | | | |
| Temperature in ° C. | 93 | 114 | 118 | 123 | 140 | 151 | 154 |
| Complex viscosity in poises | 159895 | 127836 | 122979 | 117162 | 101466 | 93554 | 91034 |

TABLE 3

| Topcoat name | Aquacer ® 1061 | | | DOW 5748A | | | Lamproof | | |
|---|---|---|---|---|---|---|---|---|---|
| Temperature in ° C. | >170 | 125 | 43.5 | 165 | 144 | 112.5 | 148 | 116 | 38.8 |
| Complex viscosity in poises | 3000 | 10000 | 600000 | 3000 | 10000 | 600000 | 3000 | 10000 | 600000 |
| Topcoat name | Actega p77L | | | Actega p78 | | | Actega p79 | | |
| Temperature in ° C. | >120 | >120 | 73.5 | 160 | 145 | 83.8 | 140 | 131 | <25 |
| Complex viscosity in poises | 3000 | 10000 | 600000 | 3000 | 10000 | 600000 | 3000 | 10000 | 600000 |

TABLE 4

| | Topcoat complex viscosity in poises | | | | | |
|---|---|---|---|---|---|---|
| Temperature in ° C. | Actega p77L | DOW 5748A | Aquacer ® 1061 | Lamproof | Actega p78 | Actega p79 |
| 25 | 3316086 | 13159297 | 1084210 | 778746 | 2601522 | 441225 |
| 30 | 3262008 | 9776394 | 1027677 | 772300 | 2616756 | 438495 |
| 35 | 3106494 | 14516987 | 859681 | 703148 | 2511443 | 438154 |
| 40 | 2728378 | 13906763 | 697527 | 566455 | 2331568 | 425927 |
| 45 | 2297447 | 11715820 | 565599 | 460264 | 2097218 | 397633 |
| 50 | 1826777 | 10773138 | 457553 | 376042 | 1814515 | 355741 |
| 55 | 1337709 | 9235641 | 381227 | 309784 | 1601679 | 307879 |
| 60 | 1039156 | 8898314 | 333893 | 257654 | 1382640 | 268195 |
| 65 | 835933 | 5929438 | 300097 | 216973 | 1225160 | 232710 |
| 70 | 697558 | 4686391 | 270351 | 188307 | 1041996 | 204710 |
| 75 | 563066 | 4524249 | 236832 | 159892 | 803405 | 167471 |
| 80 | 485563 | 3397986 | 208331 | 133820 | 660984 | 139579 |
| 85 | 405541 | 3029679 | 169911 | 104403 | 577930 | 123578 |
| 90 | 338111 | 2341840 | 130248 | 77938 | 490585 | 115267 |
| 95 | 272476 | 1838781 | 91360 | 52656 | 413745 | 104833 |
| 100 | 199361 | 1707046 | 61675 | 34733 | 343930 | 93784 |
| 105 | 129797 | 1336719 | 39479 | 21878 | 287839 | 81564 |
| 110 | 87092 | 799005 | 25652 | 15002 | 261101 | 69518 |

TABLE 4-continued

| | Topcoat complex viscosity in poises | | | | | |
|---|---|---|---|---|---|---|
| Temperature in ° C. | Actega p77L | DOW 5748A | Aquacer ® 1061 | Lamproof | Actega p78 | Actega p79 |
| 115 | 40971 | 452878 | 17081 | 10562 | 209842 | 54315 |
| 120 | — | 248952 | 12669 | 8457 | 151299 | 38705 |
| 125 | — | 141635 | 10112 | 6972 | 91815 | 25247 |
| 130 | — | 89393 | 9160 | 5877 | 52009 | 15218 |
| 135 | — | 49371 | 8413 | 4914 | 27737 | 5201 |
| 140 | — | 18543 | 7646 | 4075 | 16736 | 3143 |
| 145 | — | 8911 | 6842 | 3345 | 10176 | 1876 |
| 150 | — | 6023 | 6057 | 2778 | 6789 | 1093 |
| 155 | — | 4379 | 5314 | 2302 | 4508 | — |
| 160 | — | 3513 | 4647 | 1488 | 3010 | — |
| 165 | — | 2975 | 4071 | 1203 | 2199 | — |
| 170 | — | 2612 | 3560 | 1000 | 1860 | — |

Example 3: Coefficient of Thermal Expansion of Various Primer Coatings

The coefficients of thermal expansion (CTE) of different coatings that can be used in the primer coat were determined according to the above described method. More particularly, the CTE of Styronal® 4606, Acronal® 504, Epotal® S440, Actega 17P, Trinseo XU 316, Joncryl® HPB 4010 and mixtures of different ratios of Styronal® 4606 and Acronal® 504 were determined. CTE values for some temperature ranges are reported in Table 5 below.

TABLE 5

| | CTE [μm/(m*° C.)] | | | |
|---|---|---|---|---|
| Coatings for Primer coat # | 65 to 30° C. | 75 to 50° C. | 85 to 40° C. | −40 to −10° C. |
| Styronal ® 4606 | 133 | 248 | 261 | 81 |
| Styronal ® 4606/Acronal ® 504 (75/25 in wt) | 200 | — | — | — |
| Styronal ® 4606/Acronal ® 504 (50/50 in wt) | 217 | — | — | — |
| Styronal ® 4606/Acronal ® 504 (25:75 in wt) | 266 | — | — | — |
| Acronal ® 504 | 342 | 367 | 329 | 79 |
| Actega 17P | −27 | 31 | 19 | — |
| Joncryl ® 4010 | −81 | 304 | −9 | — |
| Joncryl ® 3030 | −130 | — | — | — |
| Epotal ® S440 | −82 | −17 | 340 | — |
| Trinseo XU316 | 253 | 279 | 278 | — |

Table 5 shows that the variation of the CTE is not linear for these types of polymeric materials. For a given temperature range, a primer coat can be in both expansion and contraction. Table 5 also shows that for mixtures of coatings, as shown for the mixtures of Styronal® 4606 and Acronal® 504, the CTE of the mixtures is substantially proportional with respect to the content of each coating.

The graph represented in FIG. 1 shows the thermal expansion curves in function of the temperature for various primer coatings. The graph represents the dimension movement at different temperatures for each primer. This graph can be used to determine the CTE. A positive slope (positive CTE), means going from a lower dimension to a higher dimension (expansion). A negative slope (negative CTE), means going from a higher dimension to a lower dimension (contraction). This chart was plotted from about 95° C. to about 24° C. for each primer. Therefore, the graph represents cooling curves and not heating curves.

Figure 2:
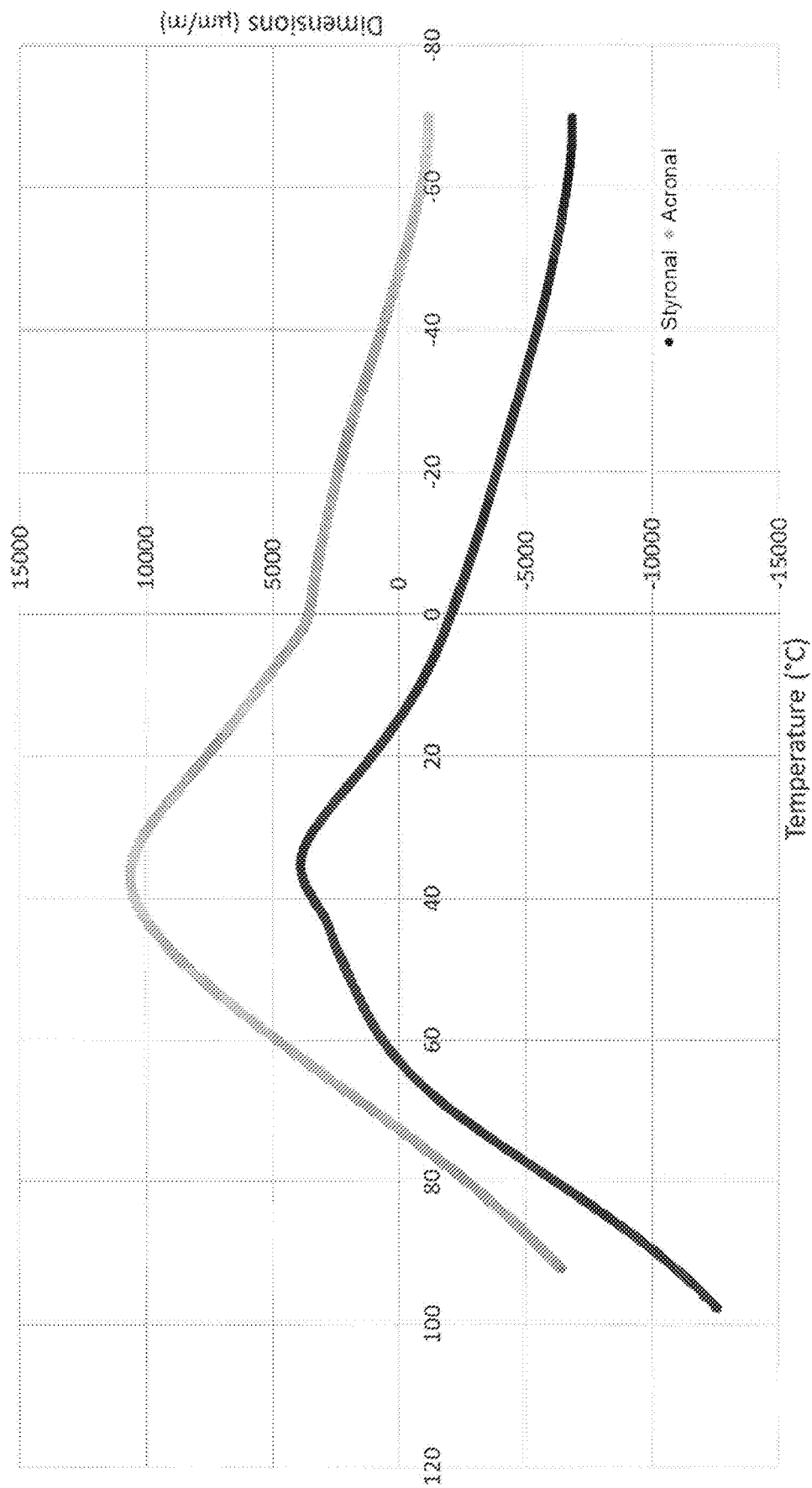
FIG. 2 represents the curves showing the dimension changes in function of the temperature for two primer coatings (Styronal® and Acronal®) observed by TMA for temperatures ranging from about 95° C. to about −70° C.
Figure 3:
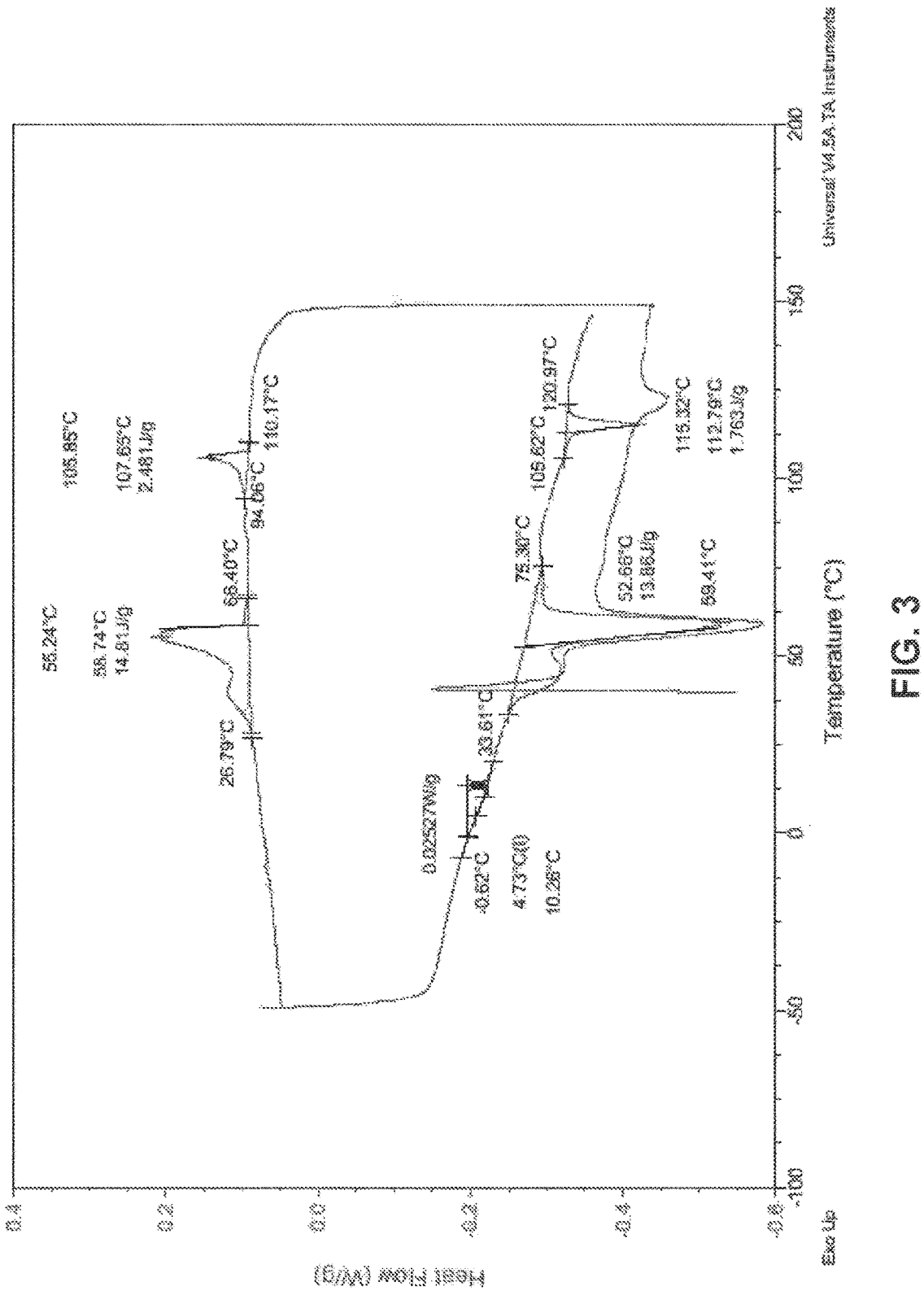
FIG. 3 represents the DSC curve of the product referred to as Actega P71 in the present description, which can be used in the topcoat according to one embodiment.
Figure 4:
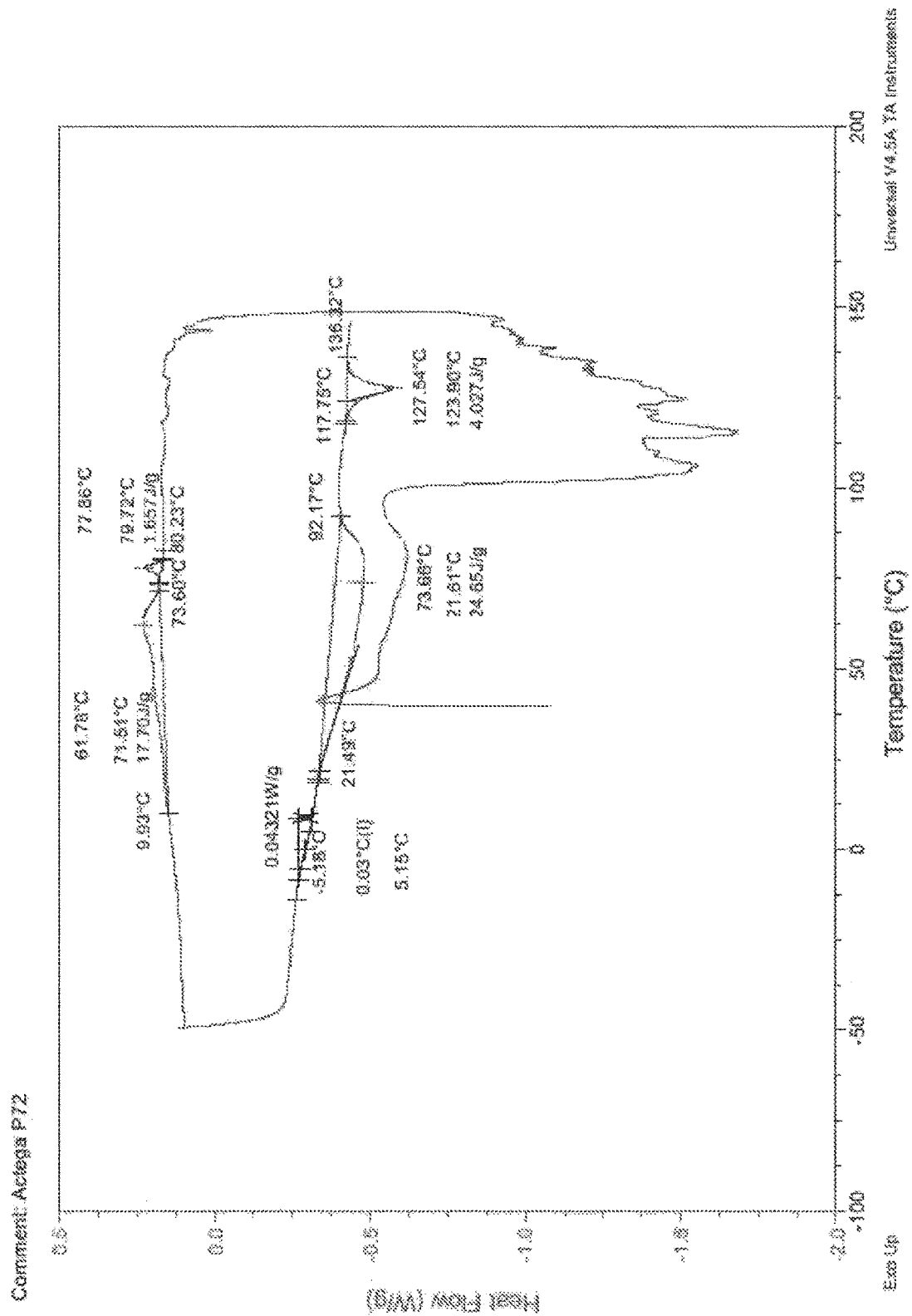
FIG. 4 represents the DSC curve of the product referred to as Actega P72 in the present description, which can be used in the topcoat according to one embodiment.
Figure 5:
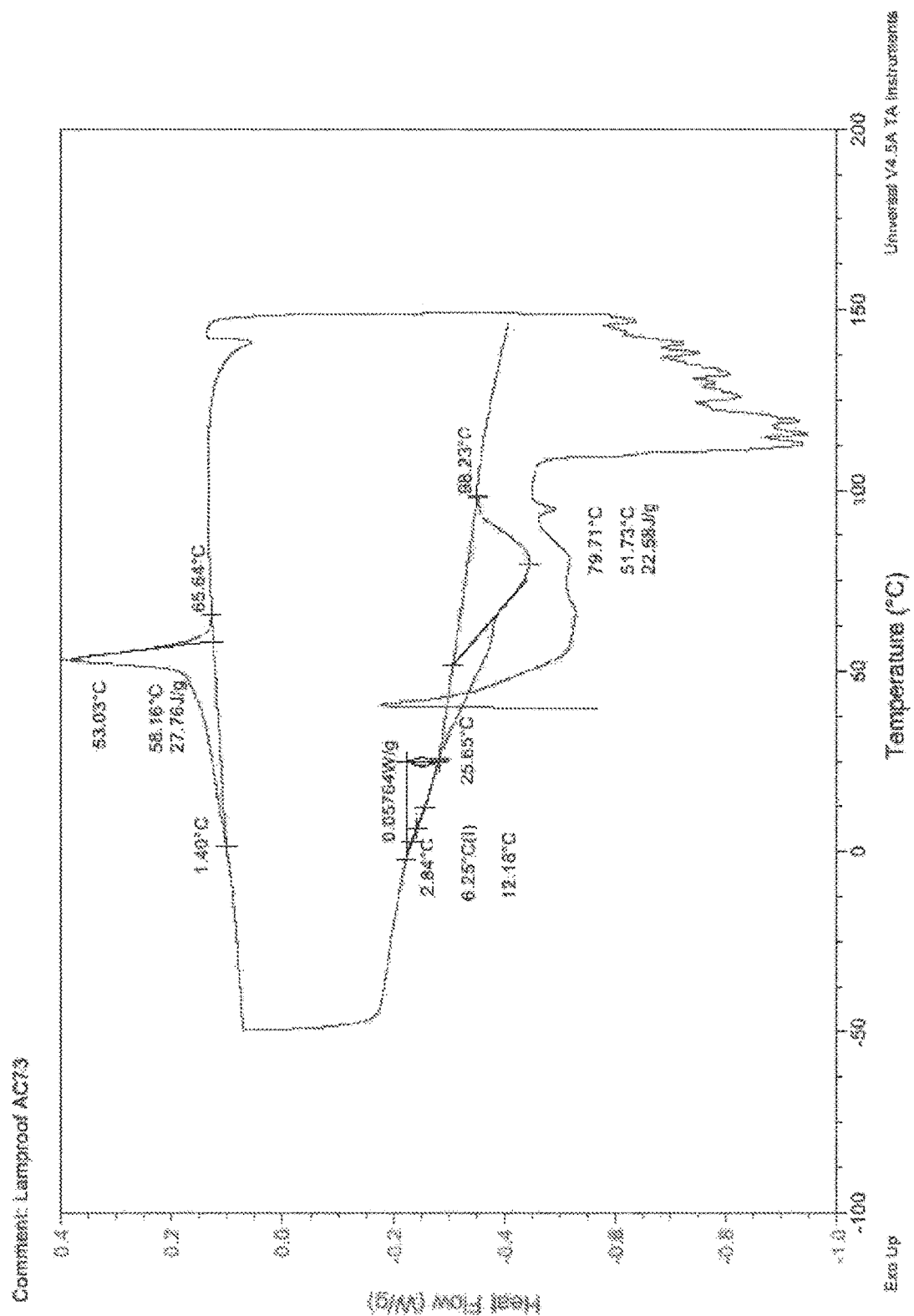
FIG. 5 represents the DSC curve of the product referred to as Lamproof AC73 in the present description, which can be used in the topcoat according to one embodiment.
Figure 6:
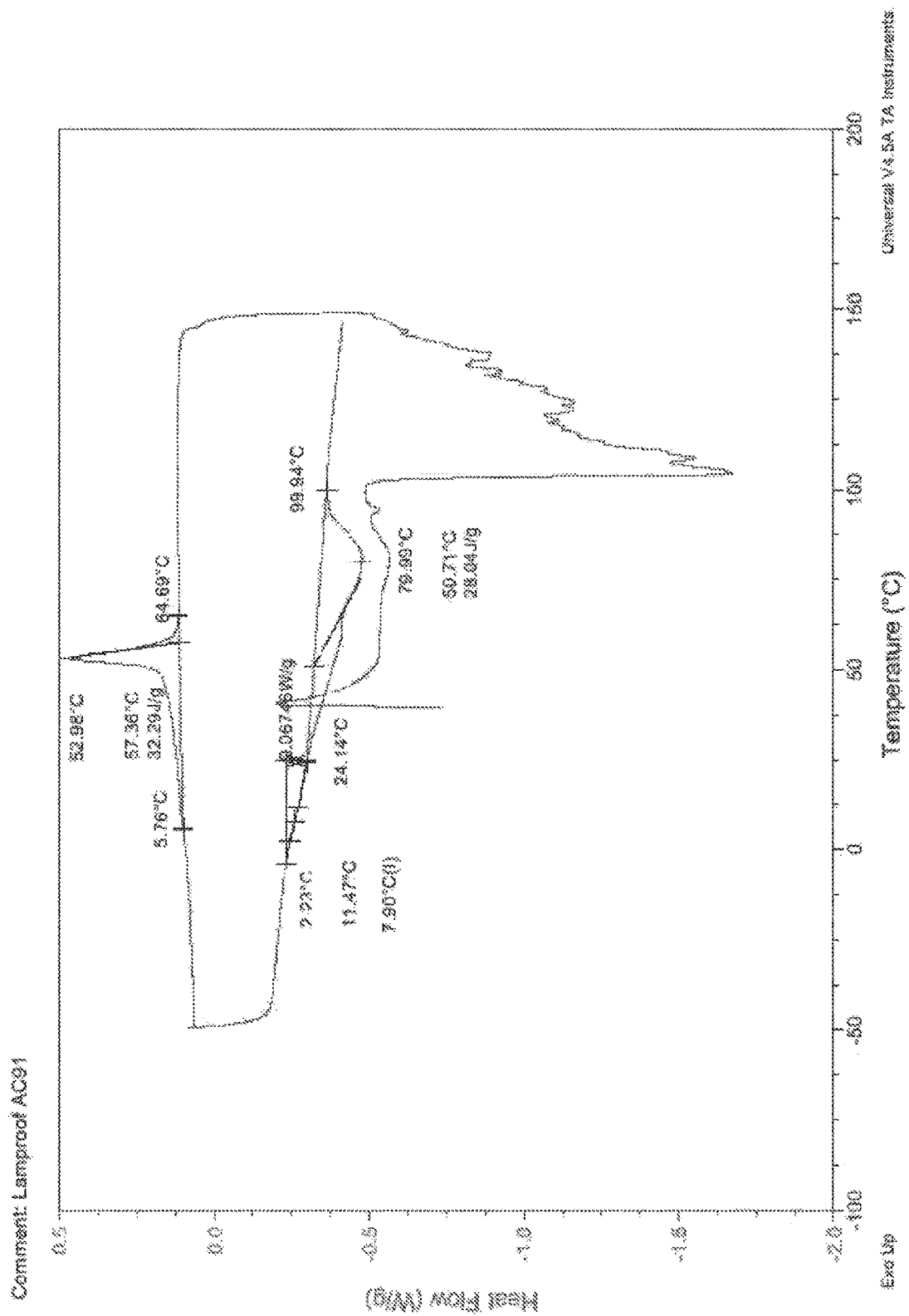
FIG. 6 represents the DSC curve of the product referred to as Lamproof AC91 in the present description, which can be used in the topcoat according to one embodiment.
Figure 7:
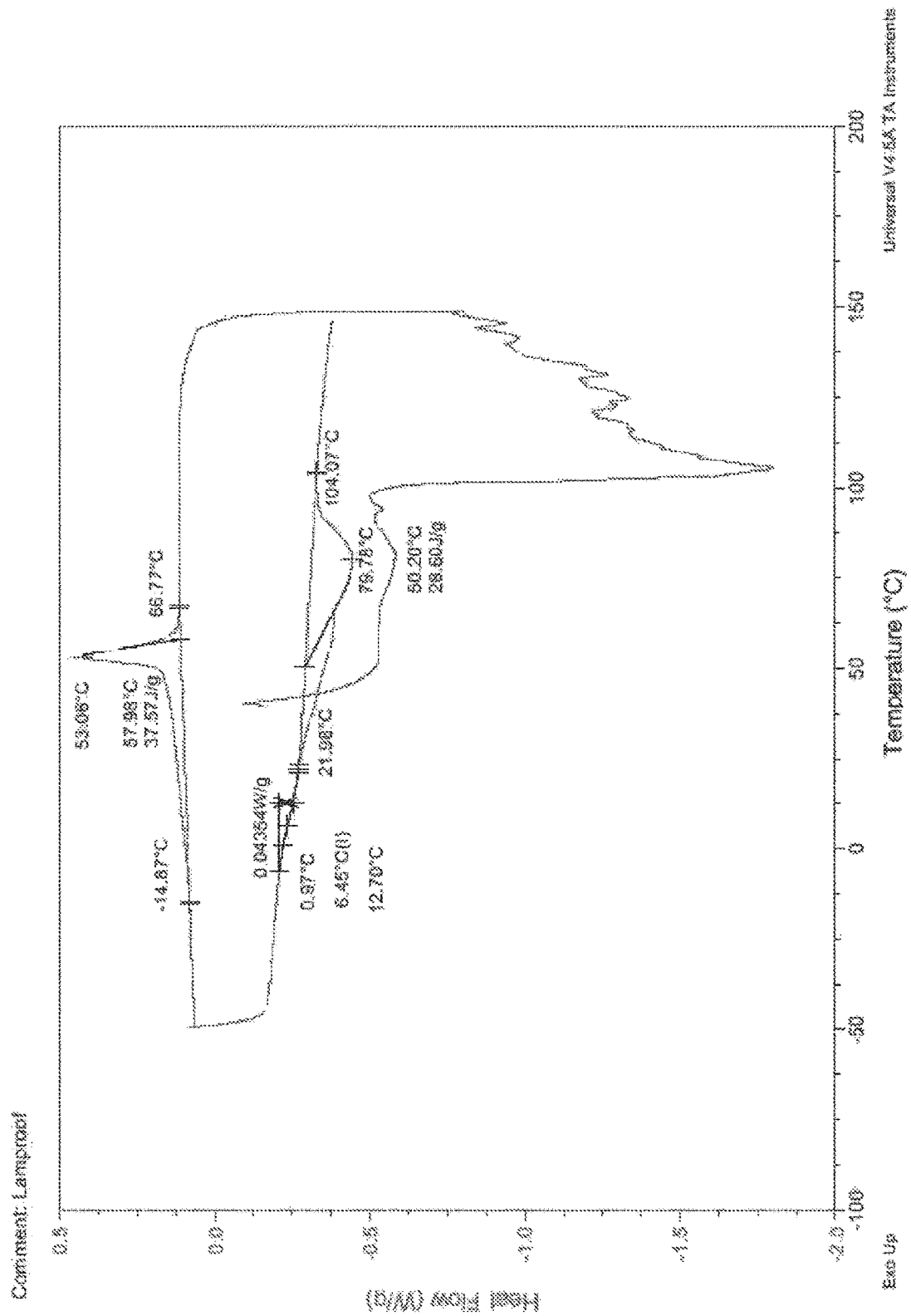
FIG. 7 represents the DSC curve of the product referred to as Lamproof in the present description, which can be used in the topcoat according to one embodiment.
Figure 8:
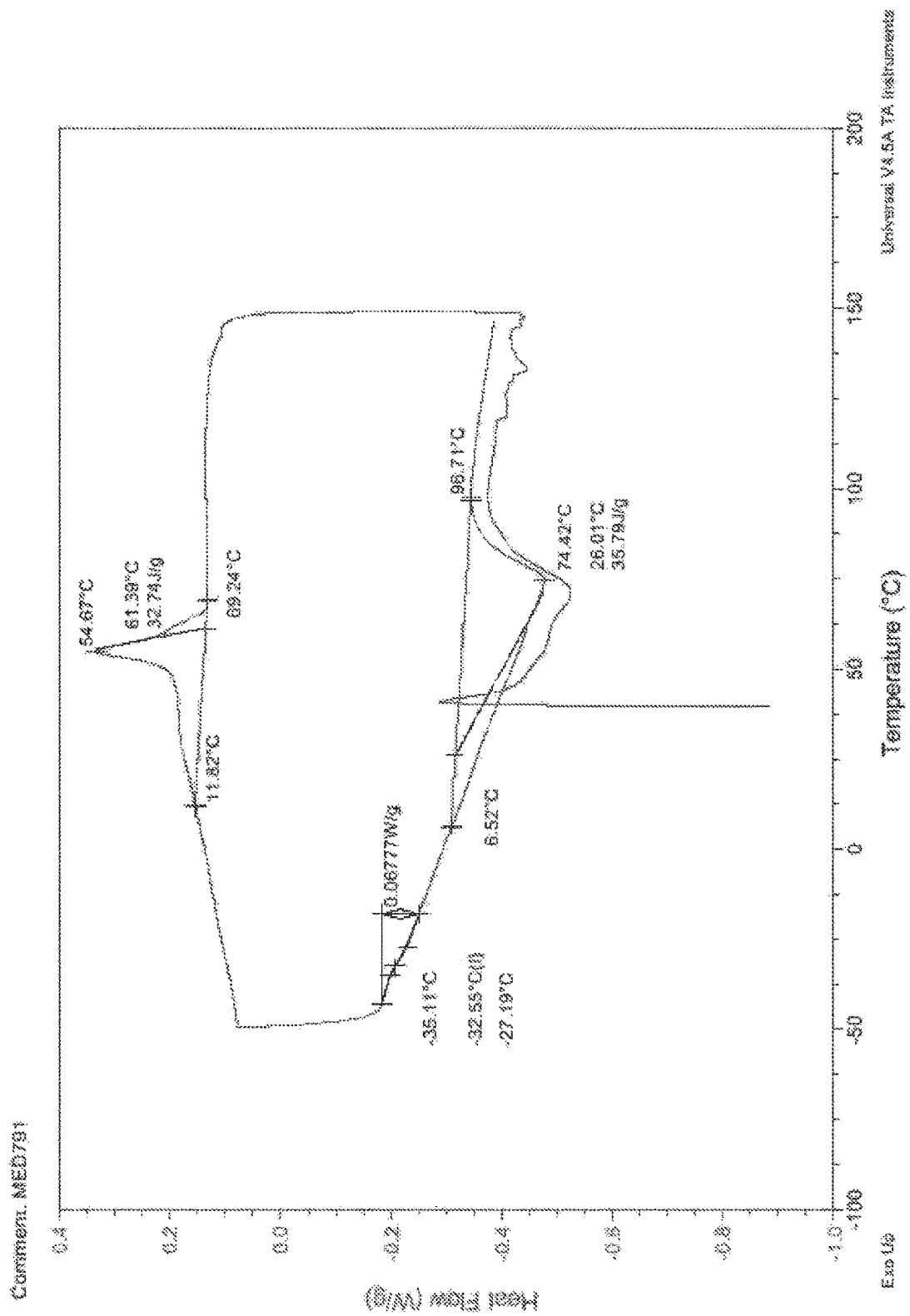
FIG. 8 represents the DSC curve of the product referred to as MED791 in the present description, which can be used in the topcoat according to one embodiment.
Figure 9:
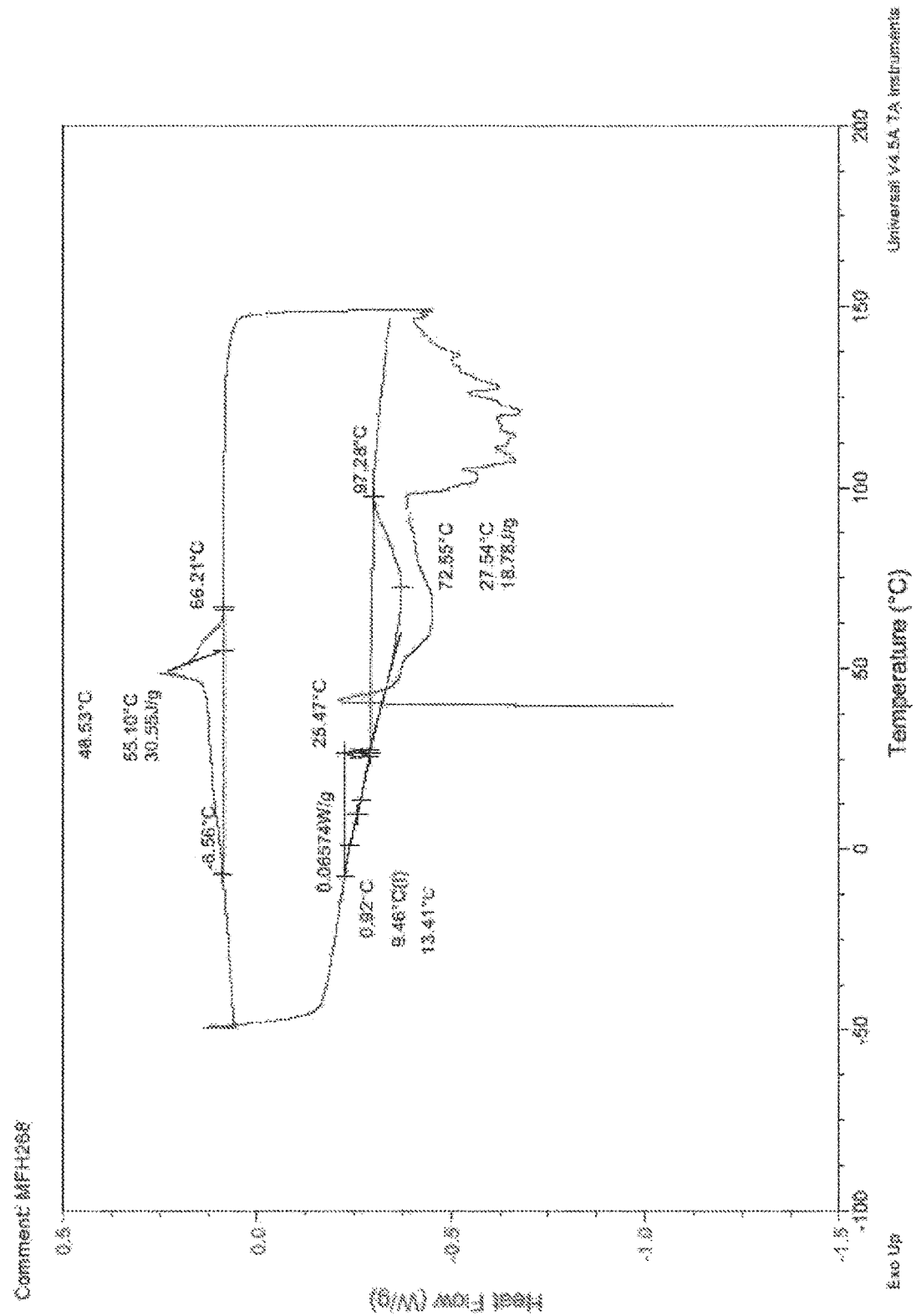
FIG. 9 represents the DSC curve of the product referred to as MFH268 in the present description, which can be used in the topcoat according to one embodiment.
Figure 10:
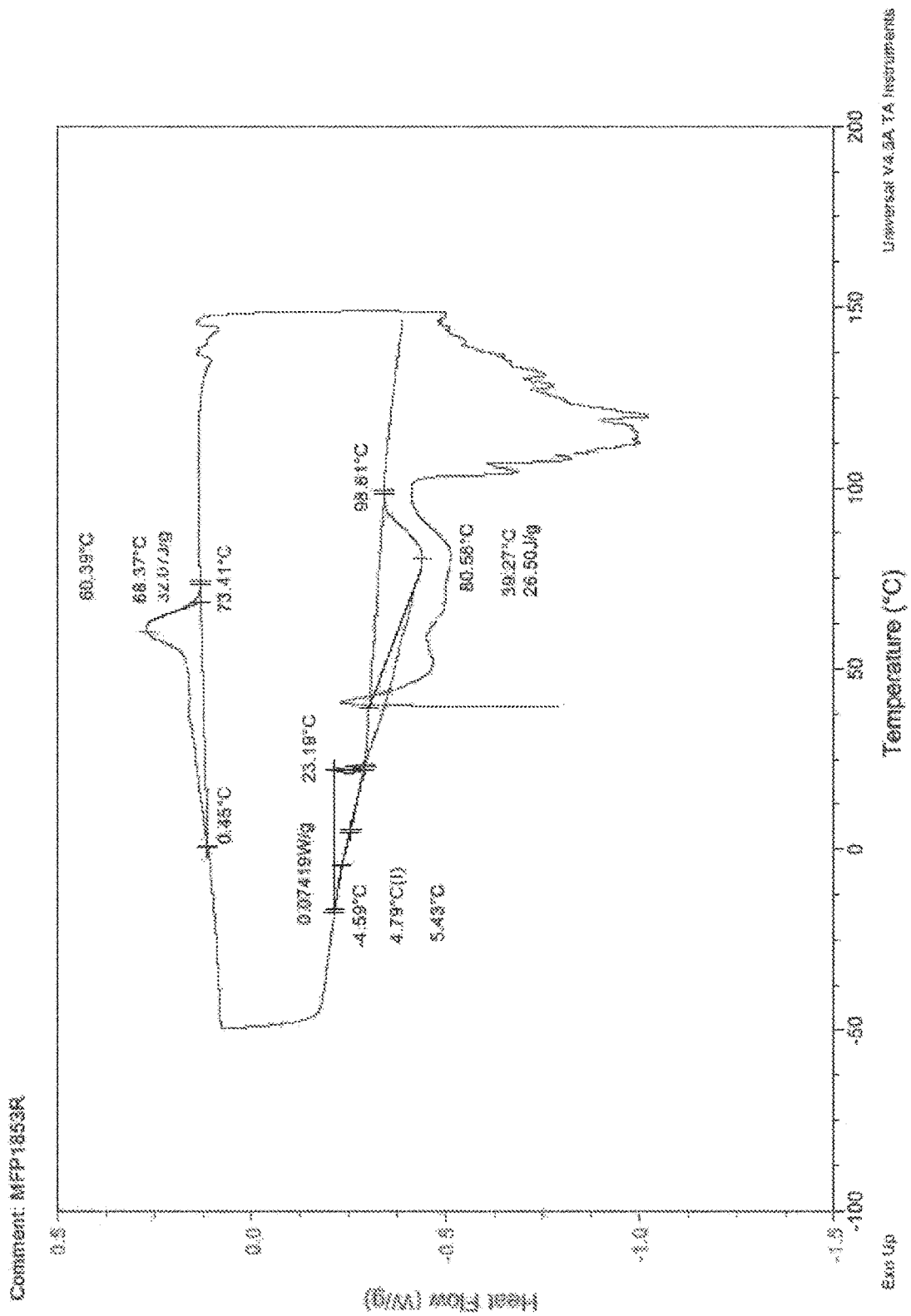
FIG. 10 represents the DSC curve of the product referred to as MFP1853R in the present description, which can be used in the topcoat according to one embodiment.
Figure 11:
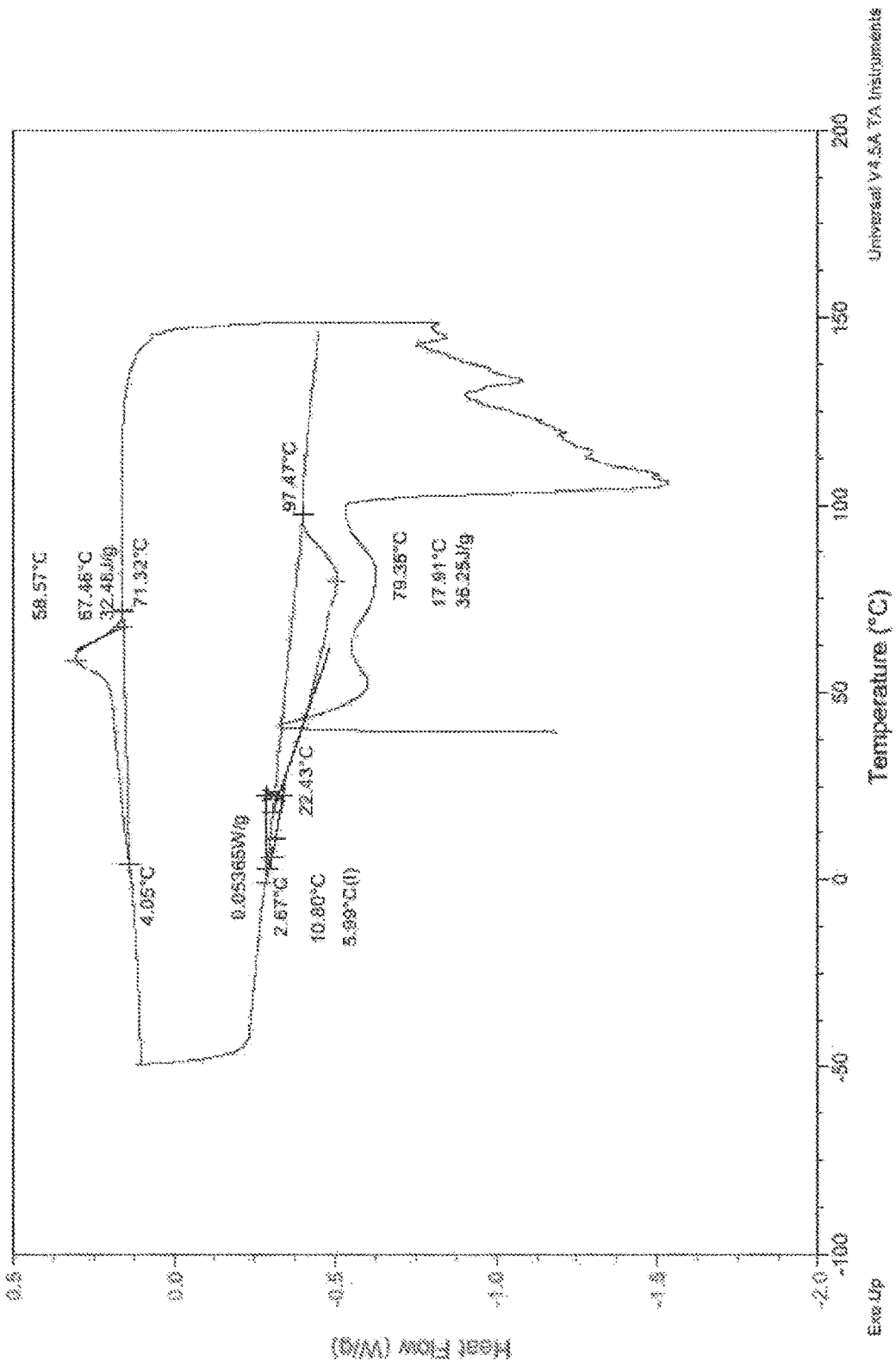
FIG. 11 represents the DSC curve of the product referred to as MP4983R in the present description, which can be used in the topcoat according to one embodiment.
Figure 12:
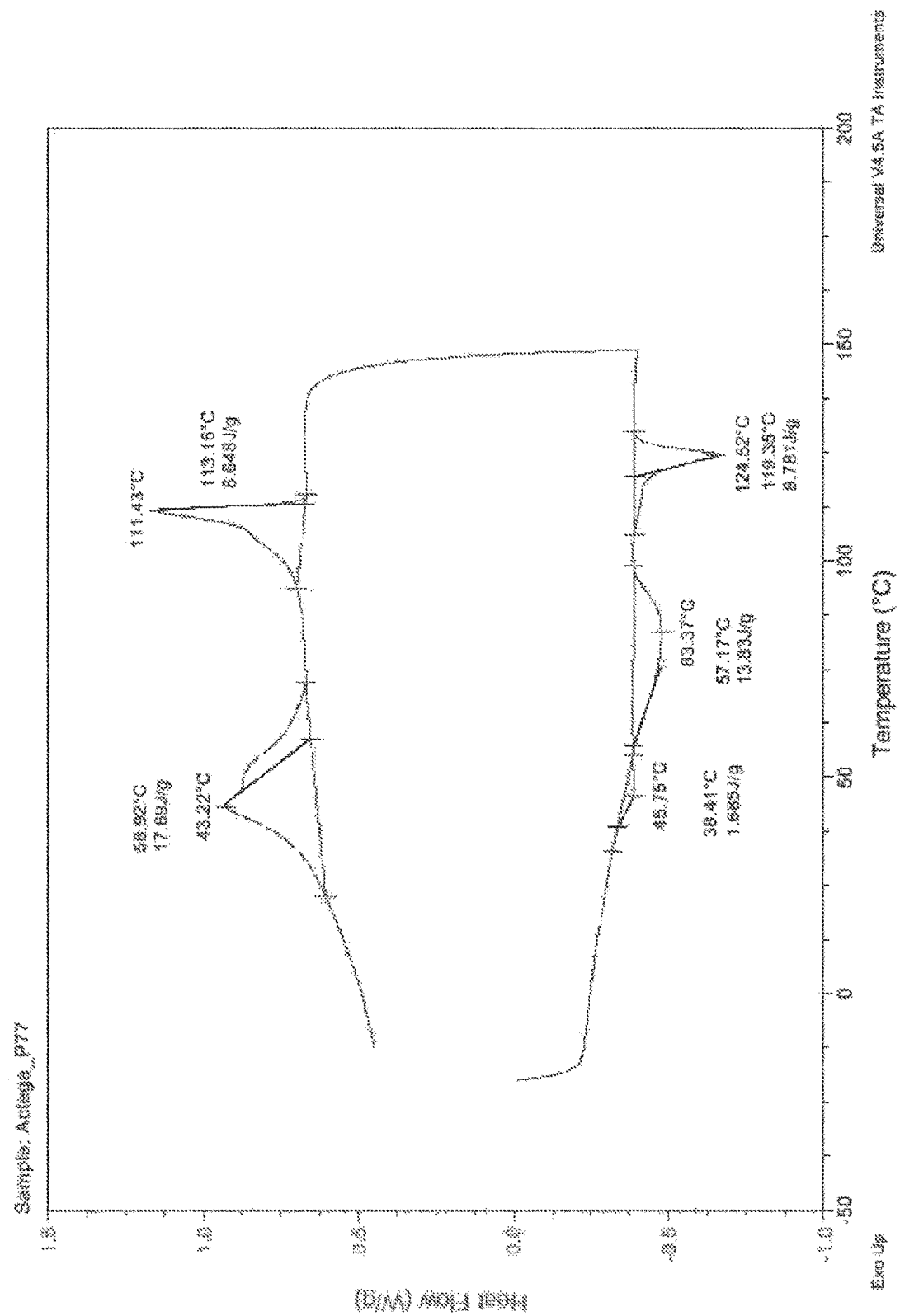
FIG. 12 represents the DSC curve of the product referred to as Actega P77L in the present description, which can be used in the topcoat according to one embodiment.
Figure 13:
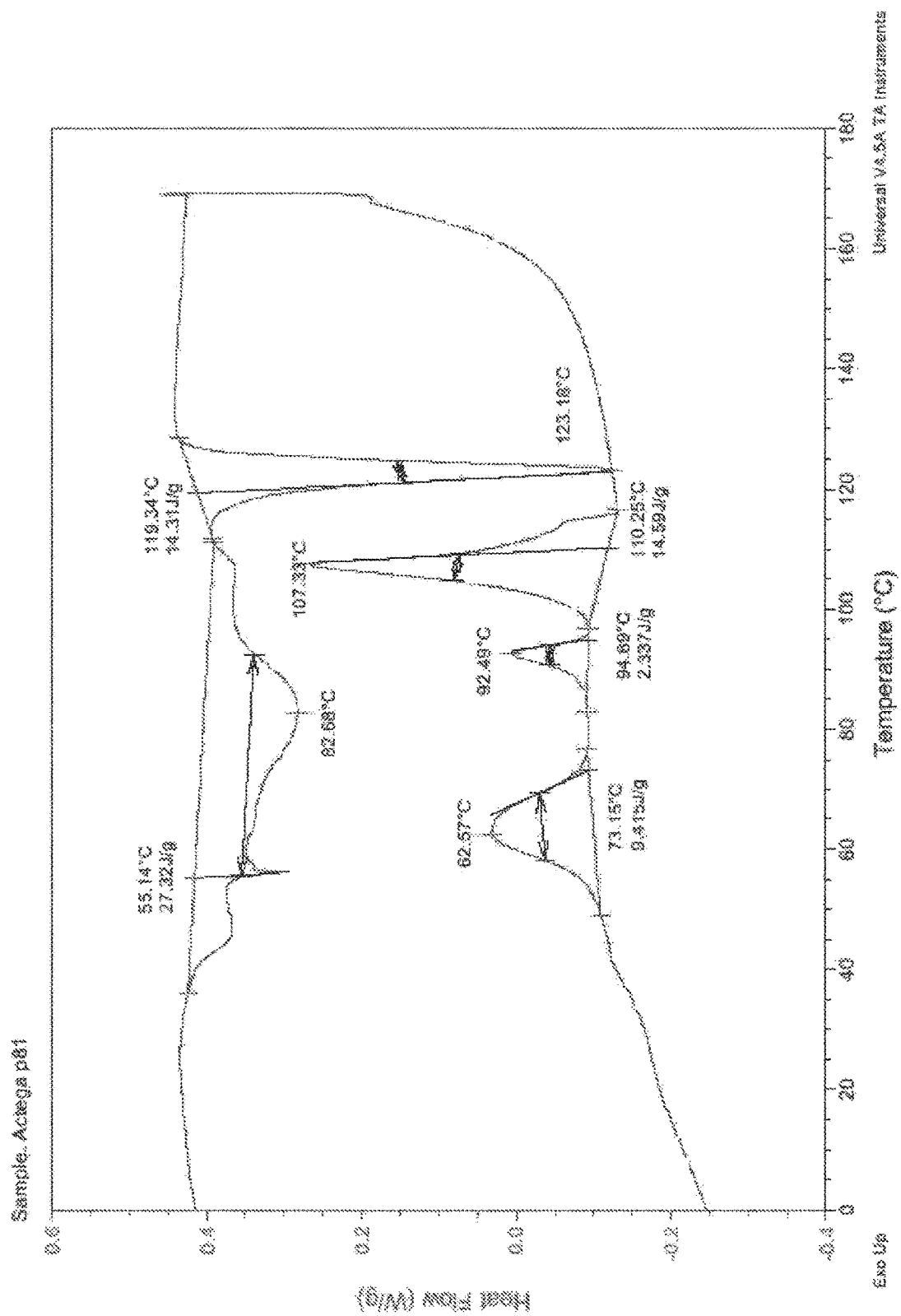
FIG. 13 represents the DSC curve of the product referred to as Actega P81 rev.2 in the present description, which can be used in the topcoat according to one embodiment.
Figure 14:
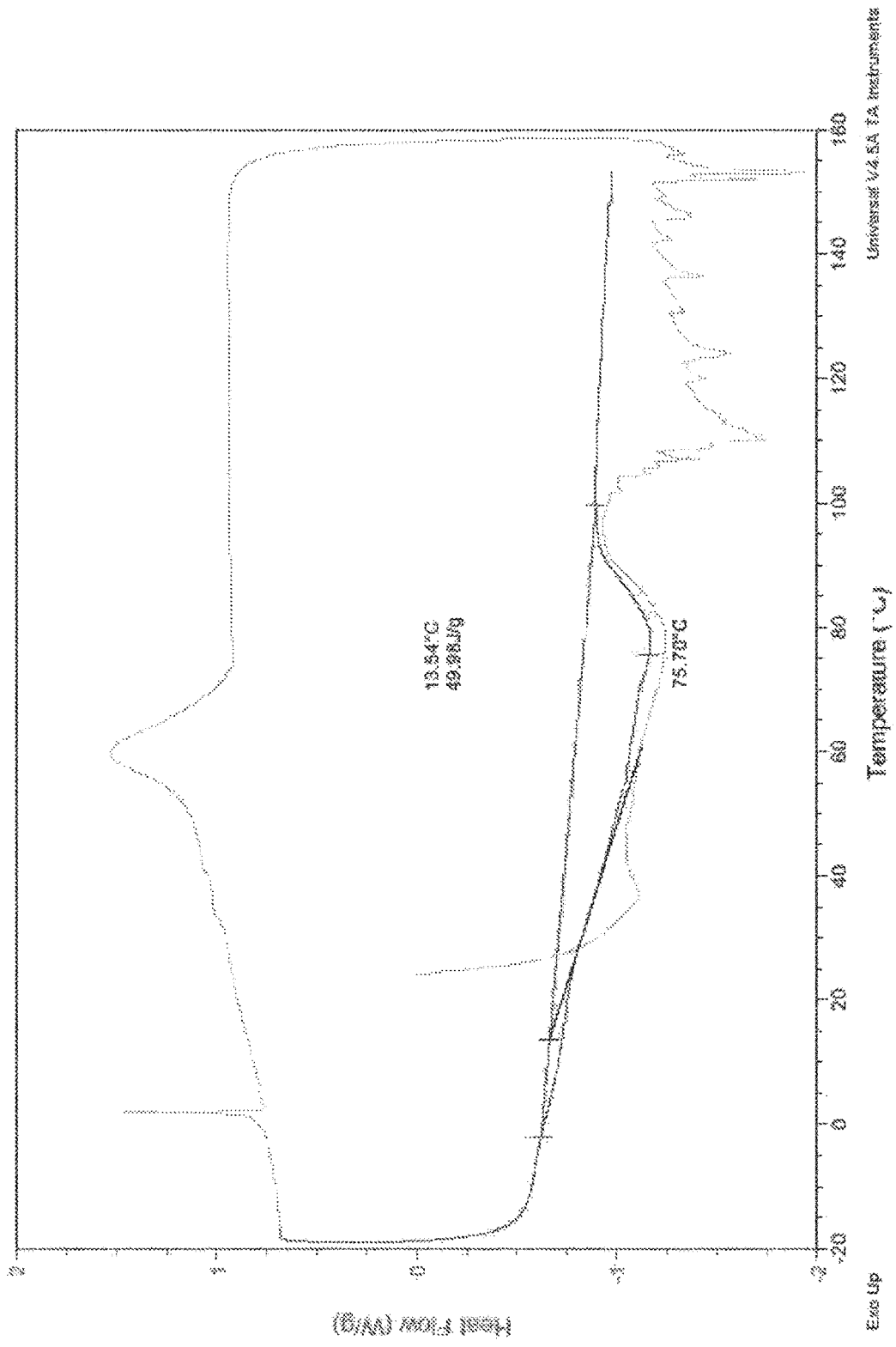
FIG. 14 represents the DSC curve of the product referred to as Aquacer 1061 in the present description, which can be used in the topcoat according to one embodiment.
Figure 15:
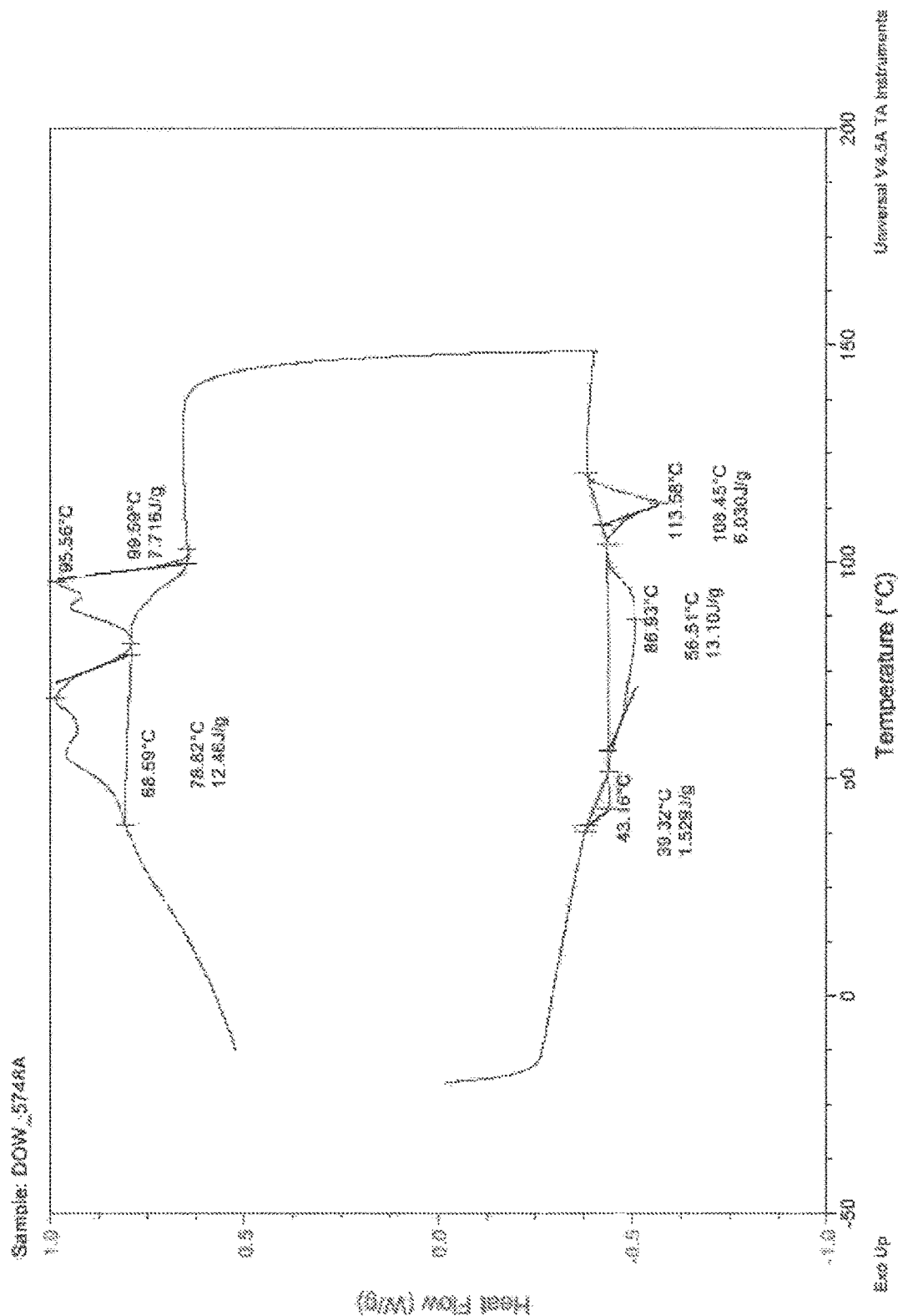
FIG. 15 represents the DSC curve of the product referred to as DOW 5748A in the present description, which can be used in the topcoat according to one embodiment.
Figure 16:
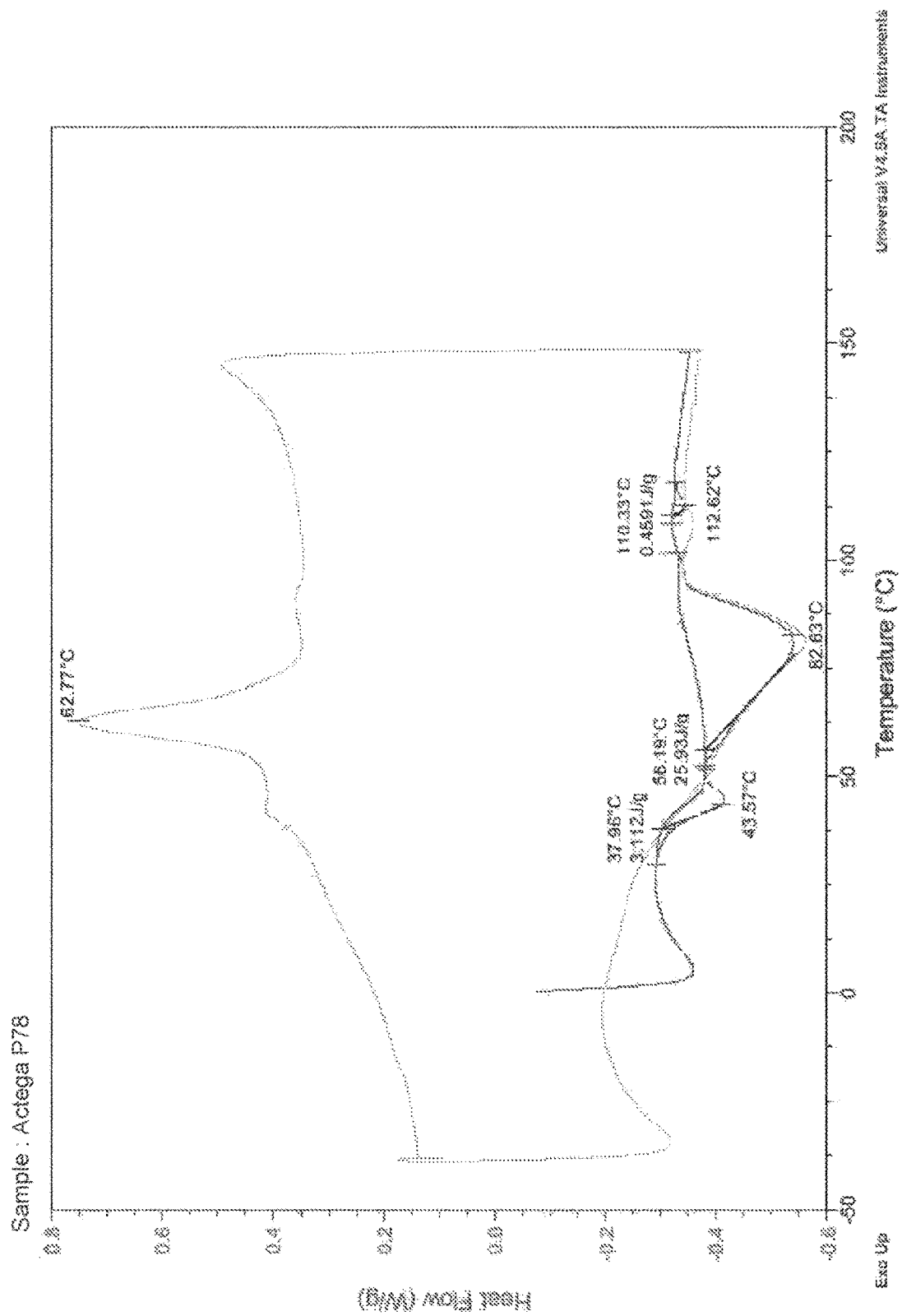
FIG. 16 represents the DSC curve of the product referred to as Actega P78 in the present description, which can be used in the topcoat according to one embodiment.

The graph represented in FIG. 2 shows the thermal expansion curves for Styronal® 4606 and Acronal® 504 for temperatures ranging from about 95° C. to about −70° C. Here again, the graph shows cooling curves.

Example 4: Coefficient of Thermal Expansion of Various Primer Coatings at the Recrystallisation Temperature of Different Topcoats The coefficients of thermal expansion (CTE) of Styronal® 4606, Acronal® 504, Epotal® S440, Actega 17P, Trinseo XU 316 and Joncryl® HPB 4010 measured at the recrystallisation temperature of the topcoats Lam proof, Aquacer® 1061, Actega p77L, Actega p78, Actega p81 rev 2 and DOW 5748A are reported in Table 6 below.

The values for the recrystallisation temperature ranges and recrystallisation peaks have been obtained from the DSC graphs of the topcoats represented in FIGS. 7 and 12-16.

TABLE 6

| Top coat name | Recrystallization range (° C.) (from DSC graph) | Recrystallization peak (° C.) (from DSC graph) | Primer CTE at recrystallization peak (±5° C.) | | | | | |
|---|---|---|---|---|---|---|---|---|
| | | | Styronal ® | Acronal ® | Trinseo XU 316 | Epotal ® | Actega 17P | Joncryl ® HPB4010 |
| Lamproof | 52-38 | ~50 | 123 | 300 | 327 | −68 | −18 | −91 |
| Aquacer ® 1061 | 75-30 | ~60 | 199 | 368 | 277 | −26 | 21 | 362 |
| Actega p77L | Zone 1 = 115-95 | Zone 1 = 111 | Zone 1 = 317* | Zone 1 = 382* | Zone 1 = 260* | Zone 1 = 2* | Zone 1 = 53* | Zone 1 = 533* |
| | Zone 2 = 70-25 | Zone 2 = 43 | Zone 2 = 135 | Zone 2 = 152 | Zone 2 = 230 | Zone 2 = 108 | Zone 2 = 48 | Zone 2 = 129 |
| Actega p78 | Zone 1 = 110-95 | Zone 1 = 100 | Zone 1 = 317* | Zone 1 = 382* | Zone 1 = 260* | Zone 1 = 108* | Zone 1 = 53* | Zone 1 = 533* |
| | Zone 2 = 80-37 | Zone 2 = 66 | Zone 2 = 295 | Zone 2 = 385 | Zone 2 = 261 | Zone 2 = −3 | Zone 2 = 50 | Zone 2 = 491 |
| Actega p81rev2 | Zone 1 = 125-113 | Zone 1 = 120 | Zone 1 = 317* | Zone 1 = 382* | Zone 1 = 260* | Zone 1 = 2* | Zone 1 = 53* | Zone 1 = 533* |
| | Zone 2 = 90-55 | Zone 2 = 83 | Zone 2 = 412 | Zone 2 = 326 | Zone 2 = 272 | Zone 2 = 24 | Zone 2 = 147 | Zone 2 = 938 |
| | Zone 3 = 50-40 | Zone 3 = 46 | Zone 3 = 128 | Zone 3 = 239 | Zone 3 = 304 | Zone 3 = −87 | Zone 3 = −31 | Zone 3 = −110 |
| DOW 5748A (Dow Rhobarr ® 320) | Zone 1 = 100-81 | Zone 1 = 95 | Zone 1 = 329 | Zone 1 = 264 | Zone 1 = 292 | Zone 1 = 305 | Zone 1 = −40 | Zone 1 = 972 |
| | Zone 2 = 77-40 | Zone 2 = 68 | Zone 2 = 327 | Zone 2 = 387 | Zone 2 = 258 | Zone 2 = 4 | Zone 2 = 58 | Zone 2 = 582 |
| MP4983R | 71-4 | ~60 | 199 | 368 | 277 | −26 | 21 | 362 |

*Theorical since CTE measurements started at about 95° C.

Example 5: Assessment of the Adhesion Between Various Primer Coats and Topcoats after Heat Sealing The adhesion between various primer coats and topcoats was determined as follows.

The primer was applied on an Ecotect® cardboard from Sonoco Trent Valley in the laboratory and dried in an oven at 105° C. for about 30 seconds. The topcoats were then applied and dried in an oven for about 30 seconds at 105° C. The resulting coated carboards were then tested for delamination of the topcoat from the primer coat using a tape (ARclad® tape from Adhesives Research inc). The tape was applied onto the surface of the topcoat and pressed lightly by hand to ensure proper adhesion with the topcoat. The tape was then pulled to verify whether the topcoat stayed onto the primer coat or if it delaminated. If the topcoat was removed from the primer coat with the tape ("peel off"), it was considered that the combination primer coat/topcoat would probably not be suitable for heat seal applications, at the tested heat seal temperature, because the cohesion between the primer and the topcoat would probably not be strong enough to ensure fiber tearing upon heat sealing. The results are reported in Tables 7 to 13.

TABLE 7

Peeling test after heat sealing with different top coats applied on Acronal ®, Styronal ® or mixtures thereof

| | Board Ecotect ® TV 16 pt | | | | | | | | |
|---|---|---|---|---|---|---|---|---|---|
| Primer coat | 100% Acronal | | | 75% Acronal/ 25% Styronal | | | 50% Acronal/ 50% Styronal | | |
| Parameters for draw down | Rod 0, weight #4 | | | Rod 0, weight #4 | | | Rod 0, weight #4 | | |
| Primer coat weight (g/m²) | 9 | | | 9 | | | 8 | | |
| Topcoat | Actega P78 | Aquacer 1061 | Lamproof | Actega P78 | Aquacer 1061 | Lamproof | Actega P78 | Aquacer 1061 | Lamproof |
| Parameters for draw down | Rod 0, weight #4 | Rod 0, weight #4 | Rod 0, weight #4 | Rod 0, weight #4 | Rod 0, weight #4 | Rod 0, weight #4 | Rod 0, weight #4 | Rod 0, weight #4 | Rod 0, weight #4 |
| Topcoat weight (g/m²) | 7 | 5 | 4 | 7 | 5 | 4 | 7 | 5 | 4 |
| Test "peel off" with tape | No "peel off" | "Peel off" | "Peel off" | No "peel off" | "Peel off" | "Peel off" | No "peel off" | No "peel off" | No "peel off" |

TABLE 7-continued

Peeling test after heat sealing with different top coats applied on Acronal ®, Styronal ® or mixtures thereof Board
Ecotect ® TV 16 pt

| Primer coat | 100% Acronal | | | 75% Acronal/ 25% Styronal | | | 50% Acronal/ 50% Styronal |
|---|---|---|---|---|---|---|---|
| Primer coat | 25% Acronal/75% Styronal | | | 100% Styronal | | | |
| Parameters for draw down | Rod 0, weight #4 | | | Rod 0, weight #4 | | | |
| Primer coat weight (g/m²) | 9 | | | 9 | | | |
| Topcoat | Actega P78 | Aquacer 1061 | Lamproof | Actega P78 | Aquacer 1061 | Lamproof | |
| Parameters for draw down | Rod 0, weight #4 | Rod 0, weight #4 | Rod 0, weight #4 | Rod 0, weight #4 | Rod 0, weight #4 | Rod 0, weight #4 | |
| Topcoat weight (g/m²) | 7 | 5 | 4 | 7 | 5 | 4 | |
| Test "peel off" with tape | No "peel off" | No "peel off" | No "peel off" | No "peel off" | No "peel off" | No "peel off" | |

The results in Table 7 show that the combinations including pure Acronal® 504 with ratios of 75 wt/wt % or more, would probably not be adequate for heat sealing. This was confirmed using a heat seal aptitude test in the laboratory (191° C. and 24 psi), which showed that the combinations using 75% Acronal® and 25% Styronal® as primer coat did not properly heat seal.

However, from the data in Table 7, one also notes that the combination of 75% Acronal® and 25% Styronal® as primer coat with Actega p78 as the topcoat, passed the tape "peel off" test. Hence, such a combination may still be a candidate for heat seal applications at lower temperatures than in the present test.

TABLE 8

Peeling test after heat sealing with different topcoats applied on Joncryl ® 4010

Board
Ecotect ® 18 pt

| Coatings | Primer Joncryl ® 4010 | TopCoat Actega P77L | Primer Joncryl ® 4010 | TopCoat Actega P81 rev 2 | Primer Joncryl ® 4010 | TopCoat DOW 5748A | Primer Joncryl ® 4010 | TopCoat Aquacer 1061 |
|---|---|---|---|---|---|---|---|---|
| % solids | 42 | 34 | 42 | 37 | 42 | 43 | 42 | 29 |
| Parameters for draw down | Rod 16, weight 4 | Rod 0, weight 4 | Rod 16, weight 4 | Rod 0, weight 4 | Rod 16, weight 4 | Rod 0, weight 4 | Rod 16, weight 4 | Rod 0, weight 4 |
| Coating weight | 9 | 5 | 11 | 5 | 10 | 6 | 11 | 3 |
| Heat seal cup stock conditions (375° C., 24 psi, 1 s) | Peeling | | No peeling | | Peeling | | Peeling | |
| Heat seal headers conditions (191° C., 5 psi, 7 s) | Peeling | | No peeling | | Peeling | | Peeling | |

TABLE 9

Peeling test after heat sealing with different top coats applied on Styronal ®

Board
Ecotect ® 18 pt

| Coatings | Primer Styronal ® | TopCoat Actega P77L | Primer Styronal ® | TopCoat Actega P81 rev 2 | Primer Styronal ® | TopCoat DOW 5748A | Primer Styronal ® | TopCoat Aquacer 1061 |
|---|---|---|---|---|---|---|---|---|
| % solids | 49 | 34 | 49 | 37 | 49 | 43 | 49 | 29 |
| Parameters for draw down | Rod 14, weight 4 | Rod 0, weight 4 | Rod 14, weight 4 | Rod 0, weight 4 | Rod 14, weight 4 | Rod 0, weight 4 | Rod 14, weight 4 | Rod 0, weight 4 |

TABLE 9-continued

Peeling test after heat sealing with different top coats applied on Styronal ®

Board
Ecotect ® 18 pt

| Coatings | Primer Styronal ® | TopCoat Actega P77L | Primer Styronal ® | TopCoat Actega P81 rev 2 | Primer Styronal ® | TopCoat DOW 5748A | Primer Styronal ® | TopCoat Aquacer 1061 |
|---|---|---|---|---|---|---|---|---|
| Coating weight | 12 | 6 | 10 | 5 | 12 | 7 | 11 | 4 |
| Heat seal cup stock conditions (375° C., 24 psi, 1 s) | No peeling | | No peeling | | No peeling | | No peeling | |
| Heat seal headers conditions (191° C., 5 psi, 7 s) | No peeling | | No peeling | | No peeling | | No peeling | |

TABLE 10

Peeling test after heat sealing with different top coats applied on Actega 17P

Board
Ecotect ® 18 pt

| Coatings | Primer Actega 17P | TopCoat Actega P77L | Primer Actega 17P | TopCoat Actega P81 rev 2 | Primer Actega 17P | TopCoat DOW 5748A | Primer Actega 17P | TopCoat Aquacer 1061 |
|---|---|---|---|---|---|---|---|---|
| % solids | 48.6 | 34.1 | 48.6 | 37.3 | 48.6 | 43.4 | 48.6 | 29.3 |
| Parameters for draw down | Rod 14, weight 4 | Rod 0, weight 4 | Rod 14, weight 4 | Rod 0, weight 4 | Rod 14, weight 4 | Rod 0, weight 4 | Rod 14, weight 4 | Rod 0, weight 4 |
| Coating weight | 13 | 7 | 12 | 6 | 14 | 8 | 12 | 5 |
| Heat seal cup stock conditions (375° C., 24 psi, 1 s) | No peeling | | No peeling | | No peeling | | No peeling | |
| Heat seal headers conditions (191° C., 5 psi, 7 s) | No peeling | | No peeling | | No peeling | | No peeling | |

TABLE 11

Peeling test after heat sealing with different top coats applied on Trinseo XU 316

Board
Ecotect ® 18 pt

| Coatings | Primer Trinseo XU316 | TopCoat Actega P77L | Primer Trinseo XU316 | TopCoat Actega P81 rev 2 | Primer Trinseo XU316 | TopCoat DOW 5748A | Primer Trinseo XU316 | TopCoat Aquacer 1061 |
|---|---|---|---|---|---|---|---|---|
| % solids | 53 | 34.1 | 53 | 37.3 | 53 | 43.4 | 53 | 29.3 |
| Parameters for draw down | Rod 12, weight 4 | Rod 0, weight 4 | Rod 12, weight 4 | Rod 0, weight 4 | Rod 12, weight 4 | Rod 0, weight 4 | Rod 12, weight 4 | Rod 0, weight 4 |
| Coating weight | 9 | 5 | 10 | 5 | — | — | — | — |

TABLE 11-continued

Peeling test after heat sealing with different top coats applied on Trinseo XU 316

| | Board Ecotect® 18 pt | | | | | | | |
|---|---|---|---|---|---|---|---|---|
| Coatings | Primer Trinseo XU316 | TopCoat Actega P77L | Primer Trinseo XU316 | TopCoat Actega P81 rev 2 | Primer Trinseo XU316 | TopCoat DOW 5748A | Primer Trinseo XU316 | TopCoat Aquacer 1061 |
| Heat seal cup stock conditions (375° C., 24 psi, 1 s) | Peeling | | No peeling | | No peeling | | Peeling | |
| Heat seal headers conditions (191° C., 5 psi, 7 s) | Peeling | | No peeling | | No peeling | | Peeling | |

TABLE 12

Peeling test after heat sealing with different top coats applied on Epotal® S440

| | Board Ecotect® 18 pt | | | | | | | |
|---|---|---|---|---|---|---|---|---|
| Coatings | Primer Epotal® S440 | TopCoat Actega P77L | Primer Epotal® S440 | TopCoat Actega P81 rev 2 | Primer Epotal® S440 | TopCoat DOW 5748A | Primer Epotal® S440 | TopCoat Aquacer 1061 |
| % solids | 46.9 | 34.1 | 46.9 | 37.3 | 46.9 | 43.4 | 46.9 | 29.3 |
| Parameters for draw down | Rod 12, weight 4 | Rod 0, weight 4 | Rod 14, weight 4 | Rod 0, weight 4 | Rod 12, weight 4 | Rod 0, weight 4 | Rod 12, weight 4 | Rod 0, weight 4 |
| Coating weight | 14 | 5 | 10 | 5 | — | — | — | — |
| Heat seal cup stock conditions (375° C., 24 psi, 1 s) | No peeling | | No peeling | | No peeling | | No peeling | |
| Heat seal headers conditions (191° C., 5 psi, 7 s) | No peeling | | No peeling | | No peeling | | No peeling | |

TABLE 13

Peeling test after heat sealing with different top coats applied on Acronal®

| | Board Ecotect® 18 pt | | | | | | | |
|---|---|---|---|---|---|---|---|---|
| Coatings | Primer Acronal® | TopCoat Actega P77L | Primer Acronal® | TopCoat Actega P81 rev 2 | Primer Acronal® | TopCoat DOW 5748A | Primer Acronal® | TopCoat Aquacer 1061 |
| % solids | 50.1 | 34.1 | 50.1 | 37.3 | 50.1 | 43.4 | 50.1 | 29.3 |
| Parameters for draw down | Rod 12, weight 4 | Rod 0, weight 4 | Rod 12, weight 4 | Rod 0, weight 4 | Rod 12, weight 4 | Rod 0, weight 4 | Rod 12, weight 4 | Rod 0, weight 4 |
| Coating weight | 12 | 6 | 12 | 6 | 12 | 6.6 | 12 | 6 |
| Heat seal cup stock conditions (375° C., 24 psi, 1 s) | Peeling | | Peeling (but few fibers tearing) | | No peeling | | Peeling | |

TABLE 13-continued

Peeling test after heat sealing with different top coats applied on Acronal ®

| Coatings | Primer Acronal ® | TopCoat Actega P77L | Primer Acronal ® | TopCoat Actega P81 rev 2 | Primer Acronal ® | TopCoat DOW 5748A | Primer Acronal ® | TopCoat Aquacer 1061 |
|---|---|---|---|---|---|---|---|---|
| | | Board Ecotect ® 18 pt | | | | | | |
| Heat seal headers conditions (191° C., 5 psi, 7 s) | Peeling | | Peeling (but few fibers tearing) | | No peeling | | Peeling | |

Example 6: Heat Sealing Aptitude of Coated Paper-Based Substrates with Various Primer Coat/Topcoat Combinations Cardboard samples coated with a primer coat and a topcoat were tested for their heat seal aptitude to produce take-out boxes. The following combinations were tested in the laboratory to screen the performance via the heat seal aptitude test previously described. An Ecotect® 16 pt from Sonoco Trent Valley was used for these tests. The primer used was Styronal® 4606 or Styronal® 4606 with 25% w/w HC90 (Hydrocarb 90, calcium carbonate from OMYA) and was applied using a Meyer rod and a certain weight to control the coating weight. The coatings were applied onto the paper substrate using a laboratory lab coater on 12" by 12" paper samples. The coatings were applied onto the paper at a speed of 300 mm/s. The coating weight of the primer varied from 11.6 to 13.5 g/m². The topcoat used was either Lamproof or MP4983R, and was applied using a rod 0, weight #4. The coating weight for the topcoat varied from 3.5 to 5.0 g/m². Each of the primer coat and topcoat were dried in an oven at 105° C. for about 30 seconds. The heat seal aptitude test was performed at 375° C., 24 psi, 1 second using the method described above. The results are reported in Table 14.

The results of the heat seal aptitude test have shown strong adhesion for all combinations. More particularly, fiber tearing was observed on 100% of the heat sealed surface for the combination Styronal® 4606 with Lamproof.

Example 7: Heat Seal Aptitude of Additional Primer Coat/Topcoat Combinations The combinations mentioned in Tables 15 and 16 were also tested for their heat seal quality (heat seal performed at cup stock conditions, 375° C., 24 psi, 1 s). No peel off was observed between the polymeric layers and the carboard fibers were teared off. Hence, all these combinations showed a good heat seal quality. For the data reported in Table 16, the heat seal aptitude was assessed both in laboratory and under real cup making conditions at the factory.

TABLE 15

| Primer coat | Topcoat |
|---|---|
| Styronal ® 4606 | Lamproof |
| Styronal ® 4606 | Actega p78 |
| Styronal ® 4606 | Actega p77L |
| Styronal ® 4606 | Actega p77 |

TABLE 14

| Coating combinations | Styronal ® 4606 (primer) | Lamproof (topcoat) | Styronal ® 4606 (primer) | MP4983R (topcoat) | Styronal ® 4606 with 25% w/w HC90 (primer) | Lamproof (topcoat) |
|---|---|---|---|---|---|---|
| | Board Ecotect TV 16 pt | | | | | |
| Parameters for draw down | Rod 14, weight #2 | Rod 0, weight #4 | Rod 14, weight #2 | Rod 0, weight #4 | Rod 0, weight #4 | Rod 0, weight #4 |
| % solids | 51.3 | 28.3 | 51.3 | 26.5 | 62 | 28 |
| Primer coat weight (g/m²) | 11.6 | 3.5 | 11.6 | 4.1 | 13.1 | 4.5 |
| Heat sealing aptitude (375° C., 24 psi, 1 second) | Strong | | Strong | | Strong | |

TABLE 15-continued

| Primer coat | Topcoat |
|---|---|
| Styronal ® 4606 | Actega p73 |
| Styronal ® 4606 | Actega p72 |
| Styronal ® 4606 | Actega p71 |
| Styronal ® 4606 | Aquacer ® 1061 |
| Styronal ® 4606 | MED791 |
| Styronal ® 4606 | MP4983R |
| Styronal ® 4606 | MFH268 |
| Styronal ® 4606 | DOW 5748A |
| Acronal ® 504A | DOW 5748A |

TABLE 16

| Primer coat | Primer coat weight (g/m²) | Topcoat | Topcoat weight (g/m²) | Peeling under lab cup sealing condition (Y/N) | Peeling under real cup making (Y/N) |
|---|---|---|---|---|---|
| Actega 17P | 10 | Actega p71 | 3 | N | N |
| Actega 17P | 11 | Actega p73 | 3 | N | — |
| Actega 17P | 10.5 | Actega p77 | 2.5 | N | N |
| Actega 17P | 10.5 | Actega p77L | 2.7 | N | N |
| Actega 17P | 9 | Actega p78 | 4.5 | N | N |
| Actega 17P | 11 | Actega p79 | 5 | N | N |
| Actega 17P | 10 | Actega p81 | 4.5 | N | — |
| Actega 17P | 12 | Actega p81 rev2 | 5.5 | N | N |
| Actega 17P | 10.5 | DOW 5748A | 5 | N | N |

Example 8: Contact Angles

The contact angles of different topcoat aqueous dispersions on the surface of dried primer coats applied to a paper-based substrate were determined using the method described above. Experimental results are reported in Table 17 below.

TABLE 17

| | Contact Angle on Acronal ® 504 [°] | | Contact Angle on Styronal ® 4606 [°] | |
|---|---|---|---|---|
| Topcoat names | Average | Standard Deviation | Average | Standard Deviation |
| Lamproof AC91 | 51 | 2 | 42 | 2 |
| Lamproof AC73 | 51 | 0 | 41 | 4 |
| Lamproof | 78 | 1 | 51 | 1 |
| Actega p73 | 42 | 2 | 37 | 0 |
| Actega p72 | 52 | 3 | 53 | 2 |
| Actega p71 | 38 | 1 | 29 | 1 |
| Aquacer 1061 | 73 | 4 | 57 | 2 |
| MED791 | 55 | 6 | 46 | 2 |
| MP4983R | 78 | 4 | 67 | 2 |
| MFP1853R | 50 | 3 | 44 | 1 |
| MFH268 | 59 | 2 | 47 | 5 |
| BASF DFC | 44 | 1 | 37 | 2 |

Example 9: Coefficient of Friction

The coefficient of friction (COF) of coated paper-based substrates was determined using the method described above. The primer coating was applied using an Invo® Tip metering element and the topcoat with a rod 10 or 12. The coating weight of the primer was about 12 g/m². The coating weight for the topcoat was about 5.0 g/m². The results are reported in Table 18 below.

TABLE 18

| | Coated paper characteristics | | | COF, MD/MD coating on coating | |
|---|---|---|---|---|---|
| Reference | Paper | Primer | Topcoat | Static | Kinetic |
| #1 | SBS* 18 pt | FXD Primer HS** Invo ® Tip | BASF DFC Rod 10 | 0.16 ± 0.05 | 0.15 ± 0.05 |
| #2 | SBS 18 pt | FXD Primer HS** Invo ® Tip | Actega p78 Rod 12 | 0.40 ± 0.03 | 0.23 ± 0.01 |
| #3 | SBS 18 pt | FXD Primer HS** Invo ® Tip | DOW 5748A Rod 10 | 0.66 ± 0.03 | 0.62 ± 0.02 |

*SBS: solid bleached sulphate;
**Styronal 4606 + 0.2-0.5% Sterocoll BL

Figure 17:
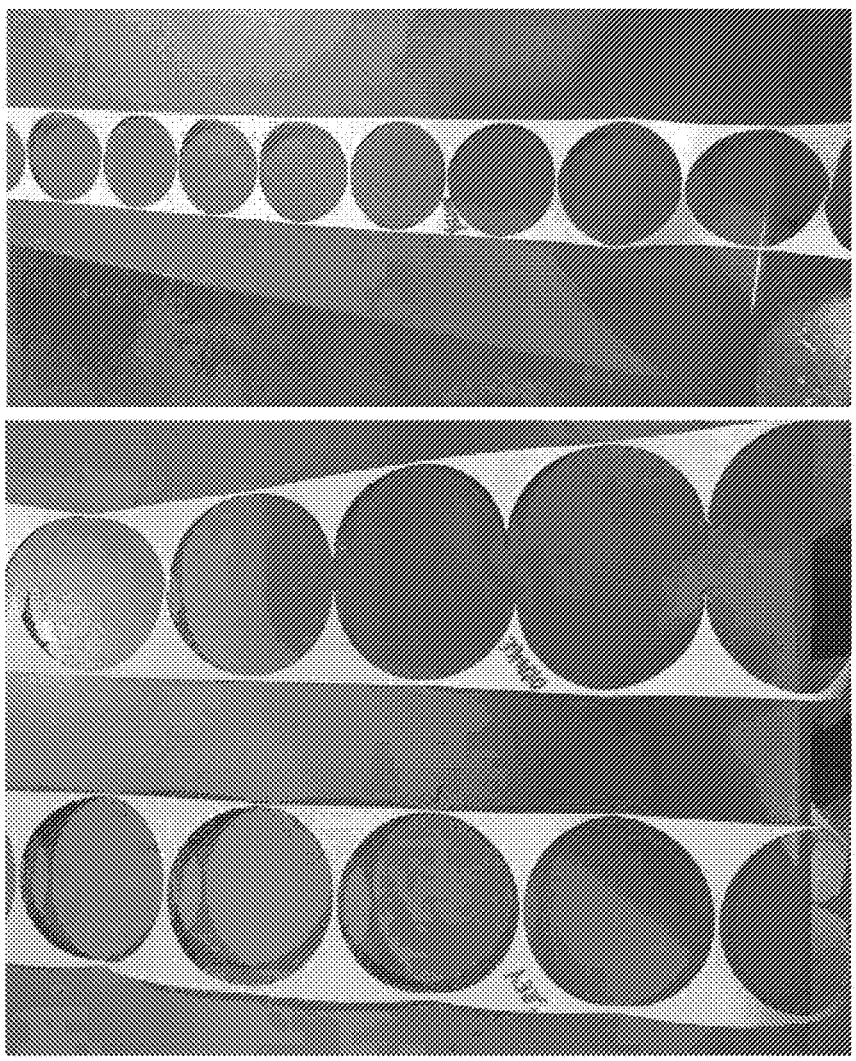
FIG. 17 represents photos of coated paper-based substrates after die cutting of bottoms of paper cups.

The coated paper-based substrates were further tested for their runnability on a cup former. FIG. 17 shows pictures of the coated papers #1, #2 and #3 after cutting bottoms of paper cups in a cup former. For coated paper #3 having a static COF of about 0.66 and kinetic COF of about 0.62, one observes that the circles are perfectly formed with a proper distance between each circle, whereas for coated paper #1 having a static COF of about 0.16 and kinetic COF of about 0.15, the circles are incomplete and adjacent circles can be said to "merge". For coated paper #2 having a static COF of about 0.40 and kinetic COF of about 0.23, the circles are complete but at the edge of "merging" (the distance between two adjacent circles is minimal). These data show that for some applications, such as for making paper cups, the COF should preferably be at least about 0.37 for the static COF and at least about 0.22 for the kinetic COF, to avoid die cutting issues due to the coating being too slippery.

Example 10: Water and Grease Resistance—Different Substrates

Styronal® 4606 as a primer and Lamproof as topcoat were applied on three different cardboards in the laboratory. The primer coat weight varied from 11 to 11.9 g/m² and the topcoat weight varied from 3.3 to 3.7 g/m². The coatings were applied onto the paper substrate using a laboratory lab coater on 12" by 12" paper samples. The coatings were applied onto the paper at a speed of 300 mm/s. Each of the primer coat and topcoat were dried in an oven at 105° C. for about 30 seconds.

Water resistance (Cobb test) and grease resistance (3M kit test) of the coated paper-based substrates were measured. The Cobb test was performed according to TAPPI Standard Test Method No. T 441 and the grease resistance determined according to TAPPI Standard Test Method No. T 559 cm-12. The results are reported in Table 19.

TABLE 19

| | Board (rough side, back of clay coating) | | | | | |
|---|---|---|---|---|---|---|
| | MetsäBoard Natural FBS Cup (310 g/m²) | | Nippon Dynawave packaging co. 6614 | | Cartulinas CMPC Graphics 18 pt | |
| Coating combinations | Styronal® 4606 (primer) | Lamproof (topcoat) | Styronal® 4606 (primer) | Lamproof (topcoat) | Styronal® 4606 (primer) | Lamproof (topcoat) |
| Coating weight (g/m²) | 11.0 | 3.3 | 11.6 | 3.7 | 11.9 | 3.6 |
| 3M Kit | 10 | | 9 | | 12 | |
| Cobb 30 min (g water/m²) | 1 ± 0.4 | | 3 ± 2 | | 8 ± 3 | |

Example 11: Plant Trials

Plant trials were performed in order to produce heat sealable coatings. The primer used in this case is a thickened formulation composed of Styronal® 4606 and 0.2-0.5% Sterocoll® BL as thickening agent. The coating was applied onto an SBS 18 pt from WestRock. The primer coating weight varied from approximately 9 to 11 g/m² for all combinations. The amount of topcoat applied varied from approximately 3.5 to 9 g/m² depending on the formulation and the trial. The primer coating was applied using an Invo® Tip metering element and the topcoat with a grooved rod. 3 M kit and Cobb (10 minutes) tests were performed on all combinations. Results (see Table 20) have shown good water and oil repellency as per the Cobb and 3 M kit results. The resulting coated substrates also showed good heat seal aptitudes.

Example 12: Repulpability Tests

A coated paperboard (SBS—18 pt from Evergreen) was tested for its repulpability using the Repulpable and Recycling Certification available at Western Michigan University (WMU standard). Two sets of tests were performed. The SBS board was coated with Styronal® as primer coat and DOW 5748A for the topcoat. The primer coat weight was approximately 12 g/m². The amount of topcoat applied was approximately 5 g/m². The results of the test are reported in the Table 21 below.

TABLE 20

| | Board SBS-WestRock (18 pt) | | | | | | | |
|---|---|---|---|---|---|---|---|---|
| Coating combinations | Thickened Styronal ® (primer) | Actega p77L (topcoat) | Thickened Styronal ® (primer) | DOW 5748A (topcoat) | Thickened Styronal ® (primer) | Lamproof (topcoat) | Thickened Styronal ® (primer) | Actega p79 (topcoat) |
| Parameters for draw down | Invo ® Tip | Rod 8 | Invo ® Tip | Rod 8 | Invo ® Tip | Rod 10 | Invo ® Tip | Rod 12 |
| Coating weight (g/m$^2$) | 9 | 3.5 | 9 | 9 | 9 | 9 | 11 | 3.5 |
| Cobb 10 min (g/m$^2$) | 5.5 | | 5.1 | | 3.9 | | 31 | |
| 3M kit | 12 | | 12 | | 12 | | 12 | |
| Heat sealing aptitude (375° C., 24 psi, 1 second) | Medium-Strong | | Very strong | | Strong | | Medium-Strong | |

TABLE 21

| | Set #1 | Set #2 |
|---|---|---|
| Moisture Content | 5.86% | 5.86% |
| Temperature range | 55° C. | 55° C. |
| Amount of fiber in charge | 25.7 g | 25.76 g |
| Temp. & pH maintained? (Y/N) | Y | Y |
| Hot slurry charged to flat screen, as instructed? (Y/N) | Y | Y |
| FINISHED SAMPLE: Oven dry mass | | |
| Amount of fiber rejects | 0.168 g | 0.194 g |
| Amount of fiber accepts | 21.84 g | 21.86 g |
| Yield of sample (% accepts) | 99.2% | 99.1% |
| Deposition observed? (Y/N) | N | N |
| SUMMARY | | |
| Operational Impact (Pass/Fail) | Pass | Pass |
| Yield (Pass/Fail) | Pass | Pass |
| To pass % accepts must be no less than 80% | | |

Several alternative embodiments and examples have been described and illustrated herein. The embodiments described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

ANNEX A

Primer coats complex viscosities (Poises)

| Temperature (° C.) | Acronal ® 504 | Styronal ® 4606 | Trinseo XU316 | Joncryl ® DFC 3030 | Actega 17P | Epotal ® S440 |
|---|---|---|---|---|---|---|
| 25.21332911 | 1141588.71 | 1586208.98 | 26480686.3 | 1160793.52 | 3432717.42 | 818477.539 |
| 30.12406878 | 1124809.22 | 1454133.4 | 23503567.5 | 1134115.12 | 3338811.25 | 786943.711 |
| 35.00224378 | 891147.539 | 1129222.97 | 15878371.9 | 1114504.14 | 3097666.33 | 760689.844 |
| 40.13587011 | 641923.848 | 821113.184 | 9225907.5 | 1109761.76 | 2719829.22 | 731357.422 |
| 45.01278611 | 476279.59 | 608431.816 | 5370581.09 | 1108651.6 | 2448243.91 | 725452.578 |
| 50.14713467 | 371455.537 | 463711.777 | 3096841.56 | 1055331.41 | 2321663.67 | 740552.695 |
| 55.02414867 | 307228.047 | 374985.469 | 1917219.14 | 1052009.8 | 2339166.41 | 765808.359 |
| 60.15769033 | 261917.031 | 307244.629 | 1275829.22 | 1244791.09 | 2439877.27 | 803595.586 |
| 65.03507411 | 232073.633 | 260069.307 | 936081.563 | 1313054.69 | 2619062.73 | 870445.547 |
| 70.16781533 | 211039.053 | 224419.395 | 729178.633 | 1267064.77 | 2757804.69 | 957759.727 |
| 75.04443278 | 196865.508 | 201218.145 | 602402.324 | 1411451.68 | 2898906.17 | 1068744.57 |
| 80.18065978 | 184635.981 | 183523.965 | 506523.066 | 1527749.61 | 2966350.23 | 1202358.48 |
| 85.05748078 | 174697.539 | 170519.468 | 445806.738 | 1600246.13 | 2880283.75 | 1308527.27 |
| 90.19083911 | 165152.1 | 158941.924 | 397533.516 | 1767334.84 | 2869422.34 | 1424467.27 |
| 95.06738544 | 156277.583 | 151308.667 | 365966.094 | 1957363.05 | 2864538.05 | 1526809.38 |
| 100.2013507 | 147550.967 | 146515.732 | 340801.309 | 2231945.31 | 2819749.38 | 1691578.91 |
| 105.079501 | 140512.612 | 143398.008 | 320872.598 | 2545991.48 | 2917295.08 | 1787220.31 |
| 110.2133034 | 133383.472 | 140082.69 | 305144.668 | 2865633.2 | 3020063.52 | 1815336.88 |
| 115.090928 | 126635.269 | 138590.229 | 293740.41 | 3125929.84 | 3100788.13 | 1953915 |
| 120.2250019 | 120362.969 | 137567.178 | 284417.354 | 3393057.66 | 3223695.7 | 1990892.66 |
| 125.1022501 | 115032.656 | 137524.048 | 276256.699 | 3501543.13 | 3294240.39 | 2040933.44 |
| 130.2358601 | 109705.806 | 137329.087 | 270882.168 | 3573443.28 | 3271431.02 | 2038331.64 |
| 135.1112501 | 105645.078 | 137364.854 | 267378.691 | 3544848.75 | 3267537.58 | 2089200.94 |
| 140.2442357 | 101333.105 | 137864.38 | 264122.344 | 3250721.25 | 3299740.7 | 1930908.75 |
| 145.121399 | 97880.8106 | 138516.177 | 261670.381 | 3077967.66 | 3179157.89 | 1678687.03 |
| 150.008406 | 94302.7344 | 139839.219 | 260102.598 | 2618253.59 | 3262781.41 | 1266852.97 |

ANNEX A

Primer coats complex viscosities (Poises)

| Temperature (° C.) | Acronal ® 504 | Styronal ® 4606 | Trinseo XU316 | Joncryl ® DFC 3030 | Actega 17P | Epotal ® S440 |
|---|---|---|---|---|---|---|
| 155.1410488 | 90256.6406 | 141185.088 | 260065.723 | 2053684.77 | 3074903.13 | 957010.195 |
| 160.0188327 | 86666.7578 | 142851.206 | 259704.678 | 1478028.13 | 2911179.14 | 692048.379 |
| 165.148346 | 83336.3623 | 144041.533 | 259868.145 | 945694.688 | 2582545.31 | 442033.711 |
| 169.2512782 | 80774.0552 | 145003.511 | 261335.361 | 625604.707 | 2394953.2 | 278923.545 |

The invention claimed is:

1. A heat sealable paper-based substrate comprising a first surface and a second surface, at least the first surface being substantially covered with at least one primer coat and at least one topcoat over the at least one primer coat thereby forming a first coated surface, wherein
the primer coat is formed from a substantially wax-free aqueous dispersion of at least one polymer or copolymer,
the primer coat has a coefficient of thermal expansion equal to or less than about 200 μm/(m° C.) for at least one operating temperature,
the primer coat has a complex viscosity of at least about 80000 poises at a heat seal temperature,
the topcoat has a different composition than the primer coat and is formed from an aqueous dispersion of at least one thermoplastic polymer or copolymer, and
the topcoat has a complex viscosity of at least about 3000 poises at a heat seal temperature,
wherein the second surface is uncoated, coated with the primer coat, coated with the topcoat, or coated with both the primer coat and the topcoat over the primer coat, and wherein, in use, the first coated surface is heat sealed to and in direct contact with (i) the uncoated second surface, (ii) the primer coat on the coated second surface, or (iii) the topcoat on the coated second surface.

2. The heat sealable paper-based substrate of claim 1, wherein the operating temperature is less than about 170° C.

3. The heat sealable paper-based substrate of claim 1, wherein the operating temperature is equal to or less than about 115° C.

4. The heat sealable paper-based substrate of claim 1, wherein the primer coat has a coefficient of thermal expansion equal to or less than about 200 μm/(m° C.) at an operating temperature comprised in a range corresponding to at least one recrystallisation temperature range of the topcoat.

5. The heat sealable paper-based substrate of claim 4, wherein the at least one recrystallisation temperature range of the topcoat is from about 30 to about 75° C.

6. The heat sealable paper-based substrate of claim 1, wherein the heat seal temperature ranges from about 60° C. to about 180° C.

7. The heat sealable paper-based substrate of claim 1, wherein the primer coat is characterized by a complex viscosity of at least about 1000000 poises at the heat seal temperature.

8. The heat sealable paper-based substrate of claim 1, wherein the topcoat is characterized by a complex viscosity of at most about 600000 poises at the heat seal temperature.

9. The heat sealable paper-based substrate of claim 1, wherein the primer coat is characterized by a complex viscosity of at least about 100000 poises at a temperature of use and the topcoat is characterized by a complex viscosity of at least about 300000 poises at the temperature of use, the temperature of use being below the heat seal temperature.

10. The heat sealable paper-based substrate of claim 9, wherein the temperature of use is up to about 115° C.

11. The heat sealable paper-based substrate of claim 1, wherein the topcoat is characterized by a melting enthalpy of at least about 10 J/g and less than or equal to about 120 J/g.

12. The heat sealable paper-based substrate of claim 11, wherein the topcoat is characterized by a melting enthalpy of at least about 10 J/g and less than or equal to about 50 J/g.

13. The heat sealable paper-based substrate of claim 1, wherein the topcoat is characterized in that is starts melting at a temperature ranging from about 20 to about 40° C. and is fully melted at a temperature ranging from about 80 to about 120° C.

14. The heat sealable paper-based substrate of claim 1, wherein the aqueous dispersion of the topcoat presents a contact angle with the primer coat equal to or less than about 70 degrees.

15. The heat sealable paper-based substrate of claim 1, wherein the primer coat comprises a polymer or copolymer selected from an acrylic acid polymer, an acrylate polymer, a butylacrylate polymer, a styrene/butadiene copolymer, a styrene/acrylate copolymer, a styrene/butylacrylate copolymer, a styrene/acrylonitrile copolymer, a butadiene/acrylonitrile copolymer, a styrene/acrylonitrile/acrylate copolymer, a polylactic acid, a polybutylene succinate, a polyhydroxyalkanoate, a polyolefin, and any mixture thereof.

16. The heat sealable paper-based substrate of claim 1, wherein the primer coat comprises a copolymer selected from a styrene/butadiene copolymer, a butadiene/acrylonitrile copolymer, a butylacrylate/styrene copolymer, a styrene/acrylonitrile/acrylate copolymer, and any mixture thereof.

17. The heat sealable paper-based substrate of claim 1, wherein the topcoat comprises an acrylic acid-based polymer dispersion, an acrylate-based polymer, a polyolefin, a polylactic acid, a polybutylene succinate, a polyhydroxyalkanoate, a polyvinylidene chloride, polyvinylalcohol, polyvinylacetate or any mixture thereof.

18. The heat sealable paper-based substrate of claim 1, wherein the topcoat comprises a polymer or copolymer selected from an acrylic acid polymer, an ethylene/acrylic acid copolymer, an ethylene/acrylate copolymer, an ethylene/methacrylate copolymer, an ethylene/ethylacrylate copolymer, a poly(hexadecylacrylate), a poly(hydroxybutyl methacrylate), an acrylate/acrylonitrile copolymer, a low density polyethylene, and any mixture thereof.

19. The heat sealable paper-based substrate of claim 1, characterized in that the first coated surface presents a coating on coating coefficient of static friction ($\mu_s$) of at least about 0.37 and a coating on coating coefficient of kinetic friction ($\mu_k$) of at least about 0.22.

20. The heat sealable paper-based substrate of claim 1, wherein the second surface of the substrate is coated with the primer coat and/or the topcoat.

21. An article comprising a heat sealable paper-based substrate comprising a first surface and a second surface, the first surface being substantially covered with at least one primer coat and at least one topcoat over the at least one primer coat thereby forming a first coated surface, wherein the primer coat is formed from a substantially wax-free aqueous dispersion of at least one polymer or copolymer, the primer coat has a coefficient of thermal expansion equal to or less than about 200 µm/(m·° C.) for at least one operating temperature, the primer coat has a complex viscosity of at least about 80000 poises at a heat seal temperature, the topcoat has a different composition than the primer coat and is formed from an aqueous dispersion of at least one thermoplastic polymer or copolymer, the topcoat has a complex viscosity of at least about 3000 poises at a heat seal temperature, and wherein at least a portion of the second surface including a part which overlaps the first coated surface after heat sealing, is covered with a varnish coat formed from the aqueous dispersion of the primer coat or the aqueous dispersion of the topcoat, wherein, in use, the first coated surface is in direct contact with the varnish coat of the second surface.

22. The article of claim 21, wherein the varnish coat is formed from the aqueous dispersion of the topcoat.

23. The article of claim 21, wherein the varnish coat is formed from the aqueous dispersion of the primer coat.

* * * * *